United States Patent
Mullins et al.

(10) Patent No.: US 12,015,623 B2
(45) Date of Patent: Jun. 18, 2024

(54) SYSTEMS AND METHODS FOR CONSENSUS DRIVEN THREAT INTELLIGENCE

(71) Applicant: Secureworks Corp., Wilmington, DE (US)

(72) Inventors: John Mullins, Riverview, FL (US); Wendy Bartlett, Odessa, FL (US)

(73) Assignee: SECUREWORKS CORP., Wilmington, DE (US)

( * ) Notice: Subject to any disclaimer, the term of this patent is extended or adjusted under 35 U.S.C. 154(b) by 252 days.

(21) Appl. No.: 17/848,714

(22) Filed: Jun. 24, 2022

(65) Prior Publication Data

US 2023/0421578 A1     Dec. 28, 2023

(51) Int. Cl.
    *H04L 9/40*            (2022.01)
    *H04L 9/32*            (2006.01)

(52) U.S. Cl.
    CPC ........ *H04L 63/1416* (2013.01); *H04L 9/3247* (2013.01); *H04L 9/3297* (2013.01); *H04L 63/1425* (2013.01); *H04L 63/1433* (2013.01)

(58) Field of Classification Search
None
See application file for complete search history.

(56) References Cited

U.S. PATENT DOCUMENTS

| | | |
|---|---|---|
| 5,937,066 A | 8/1999 | Gennaro et al. |
| 6,357,010 B1 | 3/2002 | Viets et al. |

(Continued)

FOREIGN PATENT DOCUMENTS

| | | |
|---|---|---|
| EP | 3599753 A1 | 1/2020 |
| RU | 2738344 C1 | 12/2020 |

(Continued)

OTHER PUBLICATIONS

Buyukkayhan, Ahmet Sali; Oprea, Alina; Li, Zhou; and Robertson, William; "*Lens on the endpoint; Hunting for malicious software through endpoint data analysis*"; International Symposium on Research in Attacks, Intrusions, and Defenses; RAID 2017: Research in Attacks, Intrusions, and Defenses Proceedings; pp. 73-79; Sep. 18-20, 2017; Atlanta, GA, USA.

(Continued)

*Primary Examiner* — Jeffrey R Swearingen
(74) *Attorney, Agent, or Firm* — Womble Bond Dickinson (US) LLP

(57) ABSTRACT

The present disclosure provides systems and methods for utilizing a blockchain network configured to receive threat intelligence requests and validate or invalidate such threat intelligence requests based on a consensus response from a series of nodes on the blockchain network. According to the present disclosure, the method includes receiving a threat intelligence request at one or more smart contracts of a blockchain network. The method includes broadcasting, via the one or more smart contracts, the threat intelligence request to one or more oracles. The one or more oracles may broadcast the threat intelligence request to one or more nodes. The one or more nodes may gather threat intelligence data based on the threat intelligence request. The one or more oracles may determine if consensus is reached by the one or more nodes. If consensus is reached, then a threat entry may be submitted to the one or more smart contracts.

20 Claims, 8 Drawing Sheets

(56) References Cited

U.S. PATENT DOCUMENTS

| | | |
|---|---|---|
| 7,269,578 B2 | 9/2007 | Sweeney |
| 7,331,061 B1 | 2/2008 | Ramsey et al. |
| 7,492,957 B1 | 2/2009 | Bonhaus et al. |
| 7,548,932 B2 | 6/2009 | Horvitz et al. |
| 7,555,482 B2 | 6/2009 | Korkus |
| 7,571,474 B2 | 8/2009 | Ross et al. |
| 7,594,270 B2 | 9/2009 | Church et al. |
| 7,606,801 B2 | 10/2009 | Faitelson et al. |
| 7,613,722 B2 | 11/2009 | Horvitz et al. |
| 7,770,031 B2 | 8/2010 | MacKay et al. |
| 7,841,008 B1 | 11/2010 | Cole |
| 7,856,411 B2 | 12/2010 | Darr |
| 7,926,113 B1 | 4/2011 | Gula et al. |
| 8,037,529 B1 | 10/2011 | Chiueh |
| 8,079,081 B1 | 12/2011 | Lavrik et al. |
| 8,082,506 B1 | 12/2011 | McConnell |
| 8,122,495 B2 | 2/2012 | Ramsey et al. |
| 8,156,553 B1 | 4/2012 | Church et al. |
| 8,327,419 B1 | 12/2012 | Korablev et al. |
| 8,407,335 B1 | 3/2013 | Church et al. |
| 8,490,193 B2 | 7/2013 | Sarraute et al. |
| 8,490,196 B2 | 7/2013 | Lucangeli et al. |
| 8,522,350 B2 | 8/2013 | Davenport et al. |
| 8,539,575 B2 | 9/2013 | Schmitlin et al. |
| 8,578,393 B1 | 11/2013 | Fisher |
| 8,595,170 B2 | 11/2013 | Gladstone et al. |
| 8,621,618 B1 | 12/2013 | Ramsey et al. |
| 8,701,176 B2 | 4/2014 | Ramsey et al. |
| 8,793,786 B2 | 7/2014 | Bhesania et al. |
| 8,805,881 B2 | 8/2014 | Hom et al. |
| 8,832,048 B2 | 9/2014 | Lim |
| 8,839,414 B2 | 9/2014 | Mantle et al. |
| 8,898,777 B1 | 11/2014 | Oliver |
| 8,909,673 B2 | 12/2014 | Faitelson et al. |
| 8,931,095 B2 | 1/2015 | Ramsey et al. |
| 8,938,802 B2 | 1/2015 | Davenport et al. |
| 8,959,115 B2 | 2/2015 | Marathe |
| 8,984,644 B2 | 3/2015 | Oliphant et al. |
| 9,009,828 B1 | 4/2015 | Ramsey et al. |
| 9,032,478 B2 | 5/2015 | Ballesteros et al. |
| 8,928,476 B2 | 6/2015 | Jerhotova et al. |
| 9,046,886 B2 | 6/2015 | Chong et al. |
| 9,047,336 B2 | 6/2015 | Hom et al. |
| 9,058,492 B1 | 6/2015 | Satish |
| 9,069,599 B2 | 6/2015 | Martinez et al. |
| 9,098,702 B2 | 8/2015 | Rubin et al. |
| 9,129,105 B2 | 9/2015 | Donley et al. |
| 9,130,988 B2 | 9/2015 | Seifert et al. |
| 9,137,262 B2 | 9/2015 | Qureshi et al. |
| 9,191,400 B1 | 11/2015 | Ptasinski et al. |
| 9,195,809 B1 | 11/2015 | Kaplan |
| 9,275,231 B1 | 3/2016 | Chen |
| 9,298,895 B2 | 3/2016 | Lim |
| 9,319,426 B2 | 4/2016 | Webb et al. |
| 9,338,134 B2 | 5/2016 | Yin |
| 9,338,180 B2 | 5/2016 | Ramsey et al. |
| 9,430,534 B2 | 8/2016 | Bhattacharya et al. |
| 9,438,563 B2 | 9/2016 | Yin |
| 9,438,623 B1 | 9/2016 | Thioux |
| 9,519,756 B2 | 12/2016 | Bitran et al. |
| 9,544,273 B2 | 1/2017 | Fleury et al. |
| 9,548,994 B2 | 1/2017 | Pearcy et al. |
| 9,558,352 B1 | 1/2017 | Dennison et al. |
| 9,560,062 B2 | 1/2017 | Khatri et al. |
| 9,560,068 B2 | 1/2017 | Figlin et al. |
| 9,596,252 B2 | 3/2017 | Coates et al. |
| 9,628,511 B2 | 4/2017 | Ramsey et al. |
| 9,667,656 B2 | 5/2017 | Banerjee et al. |
| 9,667,661 B2 | 5/2017 | Sharma et al. |
| 9,690,938 B1 | 6/2017 | Saxe et al. |
| 9,692,778 B1 | 6/2017 | Mohanty |
| 9,710,672 B2 | 7/2017 | Braun |
| 9,712,549 B2 | 7/2017 | Almurayh |
| 9,742,559 B2 | 8/2017 | Christodorescu et al. |
| 9,767,302 B2 | 9/2017 | Lim |
| 9,792,443 B1 | 10/2017 | Sheridan |
| 9,805,202 B2 | 10/2017 | Medeiros et al. |
| 9,825,989 B1 | 11/2017 | Mehra |
| 9,910,986 B1 | 3/2018 | Saxe et al. |
| 9,934,376 B1 | 4/2018 | Ismael |
| 9,973,524 B2 | 5/2018 | Boyer et al. |
| 9,998,480 B1 | 6/2018 | Gates |
| 10,038,706 B2 | 7/2018 | Mekky |
| 10,050,992 B2 | 8/2018 | Thyni et al. |
| 10,063,582 B1 | 8/2018 | Feng et al. |
| 10,114,954 B1 | 10/2018 | Bellis |
| 10,116,500 B1 | 10/2018 | Long et al. |
| 10,218,733 B1 | 2/2019 | Amidon |
| 10,270,790 B1 | 4/2019 | Jackson |
| 10,277,625 B1 | 4/2019 | Efstathopoulos |
| 10,311,231 B1 | 6/2019 | Kayyoor et al. |
| 10,348,747 B2 | 7/2019 | Yamada |
| 10,356,125 B2 | 7/2019 | Goutal et al. |
| 10,382,473 B1 | 8/2019 | Ashkenazy |
| 10,382,489 B2 | 8/2019 | Das et al. |
| 10,419,903 B2 | 9/2019 | Singh et al. |
| 10,425,223 B2 | 9/2019 | Roth et al. |
| 10,454,950 B1 | 10/2019 | Aziz |
| 10,474,813 B1 | 11/2019 | Ismael |
| 10,474,820 B2 | 11/2019 | Manadhata |
| 10,491,632 B1 | 11/2019 | Natarajan et al. |
| 10,521,584 B1 | 12/2019 | Sharifi Mehr |
| 10,558,809 B1 | 2/2020 | Joyce |
| 10,567,407 B2 | 2/2020 | Tang et al. |
| 10,594,713 B2 | 3/2020 | McLean |
| 10,601,865 B1 | 3/2020 | Mesdaq et al. |
| 10,642,753 B1 | 5/2020 | Steinberg |
| 10,691,810 B1 | 6/2020 | Freitag |
| 10,726,127 B1 | 7/2020 | Steinberg |
| 10,728,263 B1 | 7/2020 | Neumann |
| 10,735,470 B2 | 8/2020 | Vidas et al. |
| 10,754,958 B1 | 8/2020 | Sidagni |
| 10,762,206 B2 | 9/2020 | Titonis et al. |
| 10,785,238 B2 | 9/2020 | McLean et al. |
| 10,834,128 B1 | 11/2020 | Rajogopalan et al. |
| 10,841,337 B2 | 11/2020 | Kinder |
| 10,853,431 B1 | 12/2020 | Lin et al. |
| 10,855,717 B1 | 12/2020 | Feiman |
| 10,868,825 B1 | 12/2020 | Dominessy |
| 10,915,828 B2 | 2/2021 | Qhi |
| 10,944,758 B1 | 3/2021 | Nagargadde |
| 11,003,718 B2 | 5/2021 | McLean et al. |
| 11,038,920 B1 | 6/2021 | Sellers |
| 11,044,263 B2 | 6/2021 | McLean et al. |
| 11,113,086 B1 | 9/2021 | Steinberg |
| 11,140,193 B2 | 10/2021 | Patel |
| 11,165,862 B2 | 11/2021 | Austin et al. |
| 11,275,831 B1 | 3/2022 | Aouad et al. |
| 11,310,268 B2 | 4/2022 | Bowditch et al. |
| 11,693,972 B2 | 7/2023 | Nunes |
| 11,757,907 B1 | 9/2023 | Berger |
| 11,863,577 B1 | 1/2024 | Miseiko |
| 2002/0129135 A1 | 9/2002 | Delany et al. |
| 2002/0199122 A1 | 12/2002 | Davis |
| 2004/0128543 A1 | 7/2004 | Blake |
| 2005/0060295 A1 | 3/2005 | Gould et al. |
| 2005/0138204 A1 | 6/2005 | Iyer et al. |
| 2005/0166072 A1 | 7/2005 | Converse |
| 2005/0288939 A1 | 12/2005 | Peled et al. |
| 2006/0012815 A1 | 1/2006 | Ebner et al. |
| 2006/0037076 A1 | 2/2006 | Roy |
| 2006/0195575 A1 | 8/2006 | Delany et al. |
| 2006/0253447 A1 | 11/2006 | Judge |
| 2007/0143852 A1 | 6/2007 | Keanini |
| 2007/0192867 A1 | 8/2007 | Miliefsky |
| 2007/0226248 A1 | 9/2007 | Darr |
| 2007/0226807 A1 | 9/2007 | Ginter et al. |
| 2007/0294756 A1 | 12/2007 | Fetik |
| 2008/0077593 A1 | 3/2008 | Abrams et al. |
| 2008/0219334 A1 | 9/2008 | Brainos et al. |
| 2008/0255997 A1 | 10/2008 | Bluhm et al. |
| 2008/0262991 A1 | 10/2008 | Kapoor et al. |
| 2008/0301798 A1 | 12/2008 | Hao |
| 2008/0320000 A1 | 12/2008 | Gaddam |

(56) References Cited

U.S. PATENT DOCUMENTS

| | | |
|---|---|---|
| 2009/0038015 A1 | 2/2009 | Diamant |
| 2009/0198682 A1 | 8/2009 | Buehler et al. |
| 2010/0083374 A1 | 4/2010 | Schmitlin et al. |
| 2010/0125913 A1 | 5/2010 | Davenport et al. |
| 2010/0251329 A1 | 9/2010 | Wei et al. |
| 2011/0004771 A1 | 1/2011 | Matsushima et al. |
| 2011/0179492 A1 | 7/2011 | Markopoulou et al. |
| 2011/0197056 A1 | 8/2011 | Chen |
| 2011/0276604 A1 | 11/2011 | Hom et al. |
| 2011/0276716 A1 | 11/2011 | Coulson et al. |
| 2012/0072983 A1 | 3/2012 | McCusker et al. |
| 2012/0117640 A1 | 5/2012 | Ramsey et al. |
| 2012/0151594 A1 | 6/2012 | McClure et al. |
| 2012/0185275 A1 | 7/2012 | Loghmani |
| 2012/0246730 A1 | 9/2012 | Raad |
| 2012/0254333 A1 | 10/2012 | Chandramouli et al. |
| 2012/0260341 A1 | 10/2012 | Chan et al. |
| 2013/0074188 A1 | 3/2013 | Giakouminakis et al. |
| 2013/0104191 A1 | 4/2013 | Peled et al. |
| 2013/0138428 A1 | 5/2013 | Chandramouli et al. |
| 2013/0173620 A1 | 7/2013 | Takenouchi |
| 2013/0226938 A1 | 8/2013 | Risher et al. |
| 2013/0238319 A1 | 9/2013 | Minegishi et al. |
| 2013/0282746 A1 | 10/2013 | Balko et al. |
| 2013/0291103 A1 | 10/2013 | Davenport et al. |
| 2013/0318604 A1 | 11/2013 | Coates et al. |
| 2014/0041028 A1 | 2/2014 | Ramsey et al. |
| 2014/0047544 A1 | 2/2014 | Jakobsson |
| 2014/0051432 A1 | 2/2014 | Gupta et al. |
| 2014/0143863 A1 | 5/2014 | Deb et al. |
| 2014/0165195 A1 | 6/2014 | Brdiczka et al. |
| 2014/0181981 A1 | 6/2014 | Christodorescu |
| 2014/0215629 A1 | 7/2014 | Raz et al. |
| 2014/0223555 A1 | 7/2014 | Sanz Hernando et al. |
| 2014/0222712 A1 | 8/2014 | Samaha et al. |
| 2014/0283081 A1 | 9/2014 | Sheridan |
| 2014/0283083 A1 | 9/2014 | Gula |
| 2014/0331207 A1 | 11/2014 | Sridharan |
| 2014/0373151 A1 | 12/2014 | Webb et al. |
| 2015/0019323 A1 | 1/2015 | Goldberg et al. |
| 2015/0040225 A1 | 2/2015 | Coates et al. |
| 2015/0074390 A1 | 3/2015 | Stoback et al. |
| 2015/0135287 A1 | 5/2015 | Medeiros et al. |
| 2015/0135320 A1 | 5/2015 | Coskun |
| 2015/0156212 A1 | 6/2015 | Khatri et al. |
| 2015/0186618 A1 | 7/2015 | Poorvin et al. |
| 2015/0222652 A1 | 8/2015 | Ramsey et al. |
| 2015/0271047 A1 | 9/2015 | McLean |
| 2015/0310211 A1 | 10/2015 | Mei et al. |
| 2015/0324457 A1 | 11/2015 | McLean |
| 2015/0332054 A1 | 11/2015 | Eck |
| 2015/0365437 A1 | 12/2015 | Bell, Jr. |
| 2016/0006749 A1 | 1/2016 | Cohen et al. |
| 2016/0014140 A1 | 1/2016 | Akireddy et al. |
| 2016/0014151 A1 | 1/2016 | Prakash |
| 2016/0078365 A1 | 3/2016 | Baumard |
| 2016/0099963 A1 | 4/2016 | Mahaffey et al. |
| 2016/0112445 A1 | 4/2016 | Abramowitz |
| 2016/0134653 A1 | 5/2016 | Vallone |
| 2016/0139886 A1 | 5/2016 | Perdriau et al. |
| 2016/0156655 A1 | 6/2016 | Lotem et al. |
| 2016/0162690 A1 | 6/2016 | Reith |
| 2016/0182546 A1 | 6/2016 | Coates et al. |
| 2016/0205127 A1 | 7/2016 | Roehl |
| 2016/0241591 A1 | 8/2016 | Ramsey et al. |
| 2016/0248789 A1 | 8/2016 | Nakamatsu |
| 2016/0253497 A1 | 9/2016 | Christodorescu |
| 2016/0277423 A1 | 9/2016 | Apostolescu et al. |
| 2016/0313709 A1 | 10/2016 | Biesdorf et al. |
| 2016/0337400 A1 | 11/2016 | Gupta |
| 2016/0342805 A1 | 11/2016 | Lim |
| 2016/0378978 A1 | 12/2016 | Singla et al. |
| 2017/0026343 A1 | 1/2017 | Wardman |
| 2017/0026391 A1 | 1/2017 | Abu-Nimeh |
| 2017/0063893 A1 | 3/2017 | Franc et al. |
| 2017/0063905 A1 | 3/2017 | Muddu et al. |
| 2017/0093902 A1 | 3/2017 | Roundy et al. |
| 2017/0098087 A1 | 4/2017 | Li |
| 2017/0111379 A1 | 4/2017 | Khatri et al. |
| 2017/0140295 A1 | 5/2017 | Bandara |
| 2017/0142149 A1 | 5/2017 | Coates et al. |
| 2017/0169154 A1 | 6/2017 | Lin et al. |
| 2017/0171228 A1 | 6/2017 | McLean |
| 2017/0180418 A1 | 6/2017 | Shen et al. |
| 2017/0201381 A1 | 7/2017 | Kinder et al. |
| 2017/0201431 A1 | 7/2017 | Kinder et al. |
| 2017/0201490 A1 | 7/2017 | Kinder et al. |
| 2017/0201548 A1 | 7/2017 | Kinder et al. |
| 2017/0208084 A1 | 7/2017 | Steelman et al. |
| 2017/0208085 A1 | 7/2017 | Steelman et al. |
| 2017/0243004 A1 | 8/2017 | Kinder et al. |
| 2017/0243005 A1 | 8/2017 | Kinder et al. |
| 2017/0243009 A1 | 8/2017 | Sejpal |
| 2017/0244734 A1 | 8/2017 | Kinder et al. |
| 2017/0244750 A1 | 8/2017 | Kinder et al. |
| 2017/0244754 A1 | 8/2017 | Kinder et al. |
| 2017/0244762 A1 | 8/2017 | Kinder et al. |
| 2017/0318033 A1 | 11/2017 | Holland et al. |
| 2017/0318034 A1 | 11/2017 | Holland et al. |
| 2017/0346839 A1 | 11/2017 | Peppe |
| 2017/0359368 A1 | 12/2017 | Hodgman et al. |
| 2018/0004948 A1 | 1/2018 | Martin |
| 2018/0069885 A1 | 3/2018 | Patterson |
| 2018/0077189 A1 | 3/2018 | Doppke et al. |
| 2018/0077195 A1 | 3/2018 | Gathala |
| 2018/0089574 A1 | 3/2018 | Goto |
| 2018/0091306 A1 | 3/2018 | Antonopoulos et al. |
| 2018/0096140 A1 | 4/2018 | Bulygin |
| 2018/0103010 A1 | 4/2018 | Diaz Cuellar et al. |
| 2018/0124073 A1 | 5/2018 | Scherman et al. |
| 2018/0124085 A1 | 5/2018 | Frayman et al. |
| 2018/0124094 A1 | 5/2018 | Hamdi |
| 2018/0129811 A1 | 5/2018 | Diu |
| 2018/0152480 A1 | 5/2018 | Kinder et al. |
| 2018/0181599 A1 | 6/2018 | Crabtree et al. |
| 2018/0219899 A1 | 8/2018 | Joy |
| 2018/0234434 A1 | 8/2018 | Viljoen |
| 2018/0288198 A1 | 10/2018 | Pope et al. |
| 2018/0324203 A1 | 11/2018 | Estes |
| 2018/0367550 A1 | 12/2018 | Musuvathi et al. |
| 2019/0014149 A1 | 1/2019 | Cleveland et al. |
| 2019/0037406 A1 | 1/2019 | Wash |
| 2019/0050554 A1 | 2/2019 | Fiske |
| 2019/0068630 A1 | 2/2019 | Valecha et al. |
| 2019/0095320 A1 | 3/2019 | Biswas et al. |
| 2019/0095801 A1 | 3/2019 | Saillet et al. |
| 2019/0102554 A1 | 4/2019 | Luo et al. |
| 2019/0102564 A1 | 4/2019 | Li |
| 2019/0102646 A1 | 4/2019 | Redmon et al. |
| 2019/0104154 A1 | 4/2019 | Kumar et al. |
| 2019/0109717 A1 | 4/2019 | Reddy et al. |
| 2019/0122258 A1 | 4/2019 | Bramberger et al. |
| 2019/0132344 A1 | 5/2019 | Lem et al. |
| 2019/0166149 A1 | 5/2019 | Gerrick |
| 2019/0166152 A1 | 5/2019 | Steele |
| 2019/0173919 A1 | 6/2019 | Irimie et al. |
| 2019/0242718 A1 | 8/2019 | Siskind et al. |
| 2019/0258807 A1 | 8/2019 | DiMaggio et al. |
| 2019/0297096 A1 | 9/2019 | Ahmed et al. |
| 2019/0342296 A1 | 11/2019 | Anandam et al. |
| 2019/0347423 A1 | 11/2019 | Sanossian |
| 2019/0347433 A1 | 11/2019 | Chakravorty et al. |
| 2020/0012796 A1 | 1/2020 | Trepagnieer |
| 2020/0036750 A1 | 1/2020 | Bahnsen et al. |
| 2020/0036751 A1 | 1/2020 | Kohavi |
| 2020/0057857 A1 | 2/2020 | Roytman |
| 2020/0074084 A1 | 3/2020 | Dorrans |
| 2020/0082080 A1 | 3/2020 | Boulton |
| 2020/0097662 A1 | 3/2020 | Hufsmith |
| 2020/0097663 A1 | 3/2020 | Sato |
| 2020/0110873 A1 | 4/2020 | Rosendahl |
| 2020/0120126 A1 | 4/2020 | Ocepek |
| 2020/0177618 A1 | 6/2020 | Hassanzadeh |
| 2020/0186544 A1 | 6/2020 | Dichiu et al. |

(56) References Cited

U.S. PATENT DOCUMENTS

| | | |
|---|---|---|
| 2020/0186569 A1 | 6/2020 | Milazzo |
| 2020/0195683 A1 | 6/2020 | Kuppa et al. |
| 2020/0210590 A1 | 7/2020 | Doyle |
| 2020/0213346 A1 | 7/2020 | Shafet |
| 2020/0257792 A1 | 8/2020 | Rivard |
| 2020/0259791 A1 | 8/2020 | Garcia et al. |
| 2020/0274894 A1 | 8/2020 | Argoeti et al. |
| 2020/0285737 A1 | 9/2020 | Kraus et al. |
| 2020/0285952 A1 | 9/2020 | Liu et al. |
| 2020/0314122 A1 | 10/2020 | Jones et al. |
| 2020/0327237 A1 | 10/2020 | Shakarian |
| 2020/0336497 A1 | 10/2020 | Seul et al. |
| 2020/0351285 A1 | 11/2020 | Eisenkot et al. |
| 2020/0351302 A1 | 11/2020 | Kyle et al. |
| 2020/0351307 A1 | 11/2020 | Vidas et al. |
| 2020/0356665 A1 | 11/2020 | Denney et al. |
| 2020/0358795 A1 | 11/2020 | Urbanski et al. |
| 2020/0364338 A1 | 11/2020 | Ducau et al. |
| 2020/0372129 A1 | 11/2020 | Gupta |
| 2020/0372154 A1* | 11/2020 | Bacher ............... H04L 63/1408 |
| 2020/0380119 A1 | 12/2020 | Correa Bahnsen et al. |
| 2020/0394309 A1 | 12/2020 | Angelo et al. |
| 2021/0006575 A1 | 1/2021 | McLean et al. |
| 2021/0012012 A1 | 1/2021 | Soroush |
| 2021/0034752 A1 | 2/2021 | Canada |
| 2021/0034753 A1 | 2/2021 | Canada |
| 2021/0034895 A1 | 2/2021 | Archibald |
| 2021/0037055 A1* | 2/2021 | Dumont ............... H04L 9/50 |
| 2021/0067562 A1 | 3/2021 | Kinder et al. |
| 2021/0103663 A1 | 4/2021 | Gadhe |
| 2021/0109797 A1 | 4/2021 | Zhou |
| 2021/0112087 A1 | 4/2021 | Tassoumt |
| 2021/0112090 A1 | 4/2021 | Rivera et al. |
| 2021/0133320 A1 | 5/2021 | Havenga |
| 2021/0157926 A1 | 5/2021 | Handurukande |
| 2021/0157945 A1 | 5/2021 | Cobb |
| 2021/0160273 A1 | 5/2021 | Choi |
| 2021/0173930 A1 | 6/2021 | Dahal |
| 2021/0185057 A1 | 6/2021 | McLean |
| 2021/0192057 A1 | 6/2021 | Helfman |
| 2021/0194853 A1 | 6/2021 | Xiao |
| 2021/0216928 A1 | 7/2021 | O'Toole |
| 2021/0226926 A1 | 7/2021 | Crabtree |
| 2021/0226970 A1 | 7/2021 | Ross et al. |
| 2021/0256113 A1* | 8/2021 | Stott ............... H04L 9/3239 |
| 2021/0258327 A1 | 8/2021 | Felke et al. |
| 2021/0273957 A1 | 9/2021 | Boyer |
| 2021/0281609 A1 | 9/2021 | Crabtree |
| 2021/0306372 A1 | 9/2021 | Koral |
| 2021/0312058 A1 | 10/2021 | Chiarelli |
| 2021/0312351 A1 | 10/2021 | Pourmohammad |
| 2021/0360007 A1 | 11/2021 | Paquin |
| 2021/0390181 A1 | 12/2021 | McClay |
| 2022/0004643 A1 | 1/2022 | Sloane |
| 2022/0014542 A1 | 1/2022 | Janakiraman |
| 2022/0021691 A1 | 1/2022 | Bhatkar |
| 2022/0038424 A1 | 2/2022 | Liu et al. |
| 2022/0043911 A1 | 2/2022 | Pomerantsev |
| 2022/0070182 A1 | 3/2022 | Bowditch et al. |
| 2022/0070193 A1 | 3/2022 | Konda et al. |
| 2022/0078203 A1 | 3/2022 | Shakarian |
| 2022/0083644 A1 | 3/2022 | Kulshreshtha |
| 2022/0100868 A1 | 3/2022 | Tarrant |
| 2022/0101326 A1* | 3/2022 | Kim ............... H04L 63/0464 |
| 2022/0159033 A1 | 5/2022 | Mizrahi |
| 2022/0174077 A1* | 6/2022 | Sel ............... H04L 63/1408 |
| 2022/0179908 A1 | 6/2022 | Wei |
| 2022/0191230 A1 | 6/2022 | Morgan |
| 2022/0206819 A1 | 6/2022 | Pokam |
| 2022/0210656 A1 | 6/2022 | Shaw |
| 2022/0237764 A1 | 7/2022 | Mullet |
| 2022/0263850 A1 | 8/2022 | Colyandro, Jr. |
| 2022/0394034 A1 | 12/2022 | Keith |
| 2022/0400135 A1 | 12/2022 | Gamra |
| 2022/0407891 A1 | 12/2022 | Albanese |
| 2022/0414206 A1 | 12/2022 | Hinkle |
| 2023/0038196 A1 | 2/2023 | Labreche |
| 2023/0105087 A1 | 4/2023 | Borges |
| 2023/0370486 A1 | 11/2023 | Paquette et al. |

FOREIGN PATENT DOCUMENTS

| | | |
|---|---|---|
| WO | WO2007/002749 A2 | 1/2007 |
| WO | WO2007/090605 A1 | 8/2007 |
| WO | WO2010/059843 A2 | 5/2010 |
| WO | WO2021/067238 A1 | 4/2021 |

OTHER PUBLICATIONS

Secureworks—Log Management—Protect your infrastructure from known and emerging threats; www.secureworks.com/resources/ds-log-management; 2015 (available).

Sofya Raskhodnikova & Adam Smith; CSE 598A Algorithmic Challenges in Data Privacy; Lecture 2; Jan. 19, 2010.

Afroz, S. and Greenstadt, R. "PhishZoo: Detecting Phishing Websites by Looking at Them"; IEEE Fifth International Conference on Semantic Computing, 2011; pp. 368-375; doi: 10.1109/ICSC.2011.52; 2011.

Alkhawlani, Mohammed, Elmogy, Mohammed and Elbakry, Hazem; "Content-based image retrieval using local features descriptors and bag-of-visual words"; International Journal of Advanced Computer Science and Applications, vol. 6 No. 9 2015; pp. 212-219; 2015.

Buber, E., Demir, O. and Sahingoz, O.K .; "Feature selections for the machine learning based detection of phishing websites"; 2017 International Artificial Intelligence and Data Processing Symposium (IDAP), 2017; pp. 1-5; doi: 10.1109/DAP.2017.8090317; 2017.

Lin, Tsung-Yi, et al.; "Microsoft coco: Common objects in context"; European Conference on Computer Vision, Springer, Cham, 2014; 2014.

Liu, Y., Wang, Q., Zhuang, M. and Zhu, Y .; Reengineering Legacy Systems with RESTFul Web Service; 2008 $32^{nd}$ Annual IEEE International Computer Software and Applications Conference, 2008; pp. 785-790; doi: 10.1109/COMPSAC.2008.89; 2008.

White, Joshua S., Matthews, Jeanna N., and Stacy, John L .; A method for the automated detection phishing websites through both site characteristics and image analysis Cyber Sensing 2012; vol. 8408; International Society for Optics and Photonics, 2012; 2012.

URLVOID; URLVoid.com; retrieved from archives.org: https://web.archive.org/web/20180730215132/https://www.urlvoid.com/); Published Jul. 30, 2018.

* cited by examiner

SYSTEMS AND METHODS FOR CONSENSUS DRIVEN THREAT INTELLIGENCE

TECHNICAL FIELD

This disclosure relates generally to consensus driven threat intelligence, and more particularly relates to systems and methods for utilizing a blockchain network configured to receive threat intelligence requests and validate or invalidate such threat intelligence requests based on a consensus response from a series of nodes on the blockchain network.

BACKGROUND

A common methodology in use to try to address/reduce the perpetuation of malicious internet based threats involves the creation and curating of watchlists including various internet based sources known to pose a threat, such as certain internet protocol (IP) addresses, domains, files, and uniform resource locators (URLs). Typically, such watchlists may include a list of compromised, malicious, and/or other internet based resources that pose a threat. These watchlists further may be distributed to a community or various clients to aid in identifying and blocking these compromised and/or malicious internet based threats. However, since such watchlists are not owned by a single owner, the community may not reach a consensus regarding the contents of such watchlists, and/or the format and distribution of these watchlists. Further, watchlists, when solely curated and controlled by one entity, may be offered for sale at inflated prices due to their being considered proprietary data, preventing many in the community from using such watchlists. Additionally, such watchlists can lack historical context of potentially malicious internet based threats, leaving the community to determine if and/or how any historical context may impact the risk or potential threat of an internet based resource.

Accordingly, it can be seen that a need exists for systems and methods directed to active threat intelligence determinations that can be made with increased reliability and can be made readily available to and accessible by a plurality of computing devices (e.g., users in the community). The present disclosure is directed to the foregoing and other related, and unrelated, problems/issues in the art.

SUMMARY

Briefly described, according to various aspects, the present disclosure is directed to systems and methods for consensus driven threat intelligence. Such systems and methods may utilize a blockchain network comprising a plurality of blockchains. Each blockchain in the blockchain network may include one or more smart contracts. Each of the one or more smart contracts may comprise an API, instructions, or other program configured to transmit, retrieve, and/or store gathered and/or generated threat intelligence data corresponding to the threat intelligence request. In embodiments, the threat intelligence request may correspond to a request or query to determine whether an internet based resource or activity is or includes a valid or invalid threat or malicious action. Any one or more computing devices and/or users may submit the threat intelligence request to the blockchain network and a particular or corresponding smart contract (e.g., based on, for example, the type of threat intelligence request) active on the blockchain network. The smart contract may be configured to transmit the threat intelligence request to one or more oracles in signal communication with the blockchain network based on, for example, the type of threat intelligence request. In an embodiment, the smart contract may be configured to, periodically or at a pre-specified time interval, transmit the threat intelligence request to the one or more oracles. In another embodiment, the smart contract may be configured to generate a schedule, the schedule defining a selected time interval within which the smart contract may submit a threat intelligence request.

The one or more oracles may be configured to execute or to cause execution of a script, API, or other instructions or programs to generate the threat intelligence data at one or more corresponding nodes. The results from the one or more nodes may be transmitted back to the one or more oracles. The one or more oracles may then validate or invalidate a potential threat included in the threat intelligence request. In embodiments, the decision to validate or invalidate the potential threat of the threat intelligence request can be based on whether or not a consensus is reached by all of the nodes receiving the threat of intelligence request, and if all the nodes do not agree to validate, an error or other notice can be provided back to the oracle and/or the requestor. If a consensus is reached as to a validation or not, the validation or invalidation determination by the set of nodes may be transmitted back to the smart contract and used to update the smart contract.

In embodiments, each smart contract may be configured to transmit a threat intelligence request to the one or more oracles a plurality of times, generating a history for a particular potential threat. Further, the blockchain network may be configured to accept or receive requests to provide a watchlist. When a computing device or user requests a watchlist (e.g., submitting a request to the blockchain network for a watchlist or subset of a watchlist), each entry related to potential threats may include a history. For example, a website may initially be considered a 'safe' or "unsafe" website, and over time, such a consideration or status may change for any reason. In such examples, the historical analysis and validation/invalidation of the website or any other potential threat may be stored with a timestamp, subsequent analysis, an indicator of a compromise, an indicator of an attack, an indicator to indicate a reason the potential threat is malicious, a score, and/or other data.

In embodiments, to reach consensus as to whether a potential threat exists or not, the one or more oracles may utilize unanimous agreement from the one or more nodes. In one example, a majority of valid/invalid responses from the correspond nodes receiving the threat intelligence request may be utilized to reach consensus (e.g., simple or some other specified percentage) agreement. The systems and methods also may be configured to enable users to stake tokens on particular potential intelligence threats or intelligence threat requests. For example, a user may stake a token indicating a vote that the potential intelligence threat is valid or invalid. If the vote confirms that the intelligence threat is validated, then the user may receive the amount of tokens the user staked plus additional tokens.

In one aspect, the present disclosure provides a method for consensus driven threat intelligence utilizing a blockchain network. The method may include receiving a threat intelligence request that can be directed to at least one of one or more smart contracts implemented on a blockchain of the blockchain network and distributed to a plurality of nodes of the blockchain network. The threat intelligence request can include a request to gather intelligence related to a potential threat. The method may include broadcasting the threat intelligence request to one or more oracles configured to connect external information regarding potential threats to the blockchain. The method may include broadcasting the threat intelligence request from the one or more oracles to one or more corresponding nodes of the plurality of nodes. The method may include gathering threat intelligence data relating to the threat intelligence request at each of the one or more selected or corresponding nodes. The method may include determining, via a threat intelligence operation conducted at each of the one or more corresponding nodes and based on gathered threat intelligence data, a validation or invalidation of the potential threat. The method may include determining whether a consensus has been reached as to whether the potential threat is valid or invalid as determined by the threat intelligence operations conducted by each of the one or more corresponding nodes. The method may include, if a consensus is reached, submitting a threat entry including the gathered threat intelligence data relating to the determination of whether the potential threat of the threat intelligence request is valid or invalid resulting from the threat intelligence operations conducted by each of the one or more corresponding nodes to the at least one of the one or more smart contracts. The method may include storing and sorting each threat entry on the blockchain using the smart contract.

In an embodiment, the potential threat may be considered valid when each of the one or more corresponding nodes agrees on the validation of the potential threat submitted by the threat intelligence request.

In another embodiment, the method may include, if a consensus is not reached as to whether the potential threat is valid or invalid as determined by the threat intelligence operations conducted by each of the one or more corresponding nodes, returning an error message to the smart contract.

The threat intelligence request may be received from one or more computing devices, and, in embodiments the one or more computing nodes may be configured to stake tokens for or against validity of the potential threat. Each threat entry may comprise a timestamp, an indicator of a compromise, an indicator of an attack, a reason or an indicator to indicate a reason the potential threat is malicious, and the score. In such an embodiment, the method may include voting on whether the potential threat is malicious based on the received score. In some embodiments, the method further may include, in response to a request made to the at least one of the one or more smart contracts, generating a watchlist of threat entries from the blockchain. The watchlist may be sorted by age of the threat entry, a reason the threat entry is determined to be malicious, and/or a score relating to the determination of whether the potential threat is valid or invalid.

In an embodiment, each of the corresponding one or more nodes may include one or more of a custom API, a user based API, an internal API, an enterprise-specific API, or an external API. In another embodiment, each of the corresponding one or more nodes may validate potential threats via one or more of internet protocol (IP) address scans, advertisement banner grabs, network mapping, or gathering information from native sources, organic sources, or cultivated third party sources. The native sources, organic sources, or cultivated third party sources may relate to the potential threat's capability, infrastructure, motives, goals, relationships, resources, or some combination thereof. Each of the one or more smart contracts may include one of a blockchain application or a byte code application.

In one aspect, the present disclosure provides a system for consensus driven threat intelligence utilizing a blockchain network. The system may include one or more processors at a series of computing nodes of a decentralized and/or distributed network; each of the computing nodes including a memory having a datastore or memory configured to store and manage a blockchain of the blockchain networks comprising a plurality of smart contracts. The system may include non-transitory machine readable storage medium storing programming or computer readable instructions that are accessed and executed by the one or more processors of the computing nodes. The executed instructions may cause selected or corresponding ones of the computing nodes to receive a threat intelligence request directed to at least one of one or more smart contracts implemented on a blockchain of the blockchain network and distributed to a plurality of nodes of the blockchain network, the threat intelligence request to include a request to gather intelligence regarding a potential threat the threat intelligence request to include a potential threat. The executed instructions may cause the computing nodes to broadcast the threat intelligence request to one or more oracles configured to connect external information regarding potential threats to the blockchain. The executed instructions may cause the computing nodes to receive or determine a validation or invalidation of the potential threat based on a broadcast of the threat intelligence request from the one or more oracles to corresponding one or more nodes of a plurality of nodes, the corresponding one or more nodes of a plurality of nodes to gather threat intelligence data relating to the threat intelligence request and to generate a validation or invalidation of the threat intelligence request. The executed instructions may cause the one or more oracles to determine whether a consensus has been reached as to whether the potential threat is valid or invalid as determined by the threat intelligence operations conducted by each of the one or more corresponding nodes. The executed instructions may cause the one or more oracles to, if a consensus is reached, submit a threat entry including the gathered threat intelligence data relating to the determination of whether the potential threat of the threat intelligence request is valid or invalid based on the threat intelligence operations conducted by each of the one or more corresponding nodes.

In an embodiment, each of the corresponding one or more nodes may provide a timestamp, an indicator of a compromise, an indicator of an attack, a reason or an indicator to indicate a reason the potential threat is malicious, and a score.

In another embodiment, the computer readable instructions that are accessed and executed by the one or more processors of the computing nodes may cause the computing nodes to generate, in response to a received watchlist request from a computing device, a sorted watchlist, the watchlist including each validated potential threat. The executed instructions may cause the computing nodes to transmit the sorted watchlist to the computing device. The sorted watchlist may be sorted based on one or more of the timestamp, the reason or indicator to indicate the reason the potential threat is malicious, or a score.

In another embodiment, the one or more computing nodes may be configured to enable a user or operator stake tokens for or against validity of the potential threat. If the potential threat is validated, computing nodes that staked tokens for validity of the potential threat receive the staked tokens and additional tokens.

In another aspect, the present disclosure provides a system for consensus driven threat intelligence utilizing a blockchain network. The system may include a blockchain circuitry. The blockchain circuitry may operate with the blockchain network, and may be configured to store one or more smart contracts, the one or more smart contracts generated by one or more computing nodes to thereby define a blockchain of the blockchain network. The blockchain circuitry may receive a threat intelligence request directed to at least one of the one or more smart contracts implemented on a blockchain of the blockchain network and distributed to a plurality of nodes of the blockchain network, the threat intelligence request to include a request to gather intelligence related to a potential threat. The blockchain circuitry may be configured to broadcast, based on an API in the at least one of the one or more smart contracts corresponding to the potential threat, the threat intelligence request to one or more oracles configured to connect external information regarding potential threats to the blockchain. The blockchain circuitry may be configured to receive validation data from the one or more oracles. The blockchain circuitry may be configured to store results associated with the validation data. The system may include an oracle circuitry including the one or more oracles. The oracle circuitry may be configured to receive the threat intelligence request from the at least one of the one or more smart contracts. The oracle circuitry may be configured to broadcast the threat intelligence request to one or more nodes corresponding to the one or more oracles. The oracle circuitry may be configured to receive results from the one or more nodes, the results to include data indicating validation or invalidation of the potential threat of the threat intelligence request. The oracle circuitry may be configured to validate the potential threat based on the results from each of the one or more nodes. The oracle circuitry may utilize results received from the one or more nodes within a specified time for the threat intelligence request. The system may include a node circuitry configured to perform a threat assessment operation using data related to the potential threat of the threat intelligence request. The node circuitry may be configured to transmit the results to the corresponding one or more oracles. The oracle circuitry can be configured to determine if a consensus was reached by the one or more nodes as to whether to validate or invalidate the potential threat. In embodiments, if there is no consensus among the one or more nodes, an error message can be returned and/or the request resubmitted for further review by the nodes or by other circuitry.

In an embodiment, each of the one or more smart contracts may be configured to, in response to a request received from the one or more computer nodes, generate a watchlist based on the threat entries stored on the blockchain circuitry.

Various objects, features and advantages of the present disclosure will become apparent to those skilled in the art upon a review of the following detail description, when taken in conjunction with the accompanying drawings.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

Figure 1:
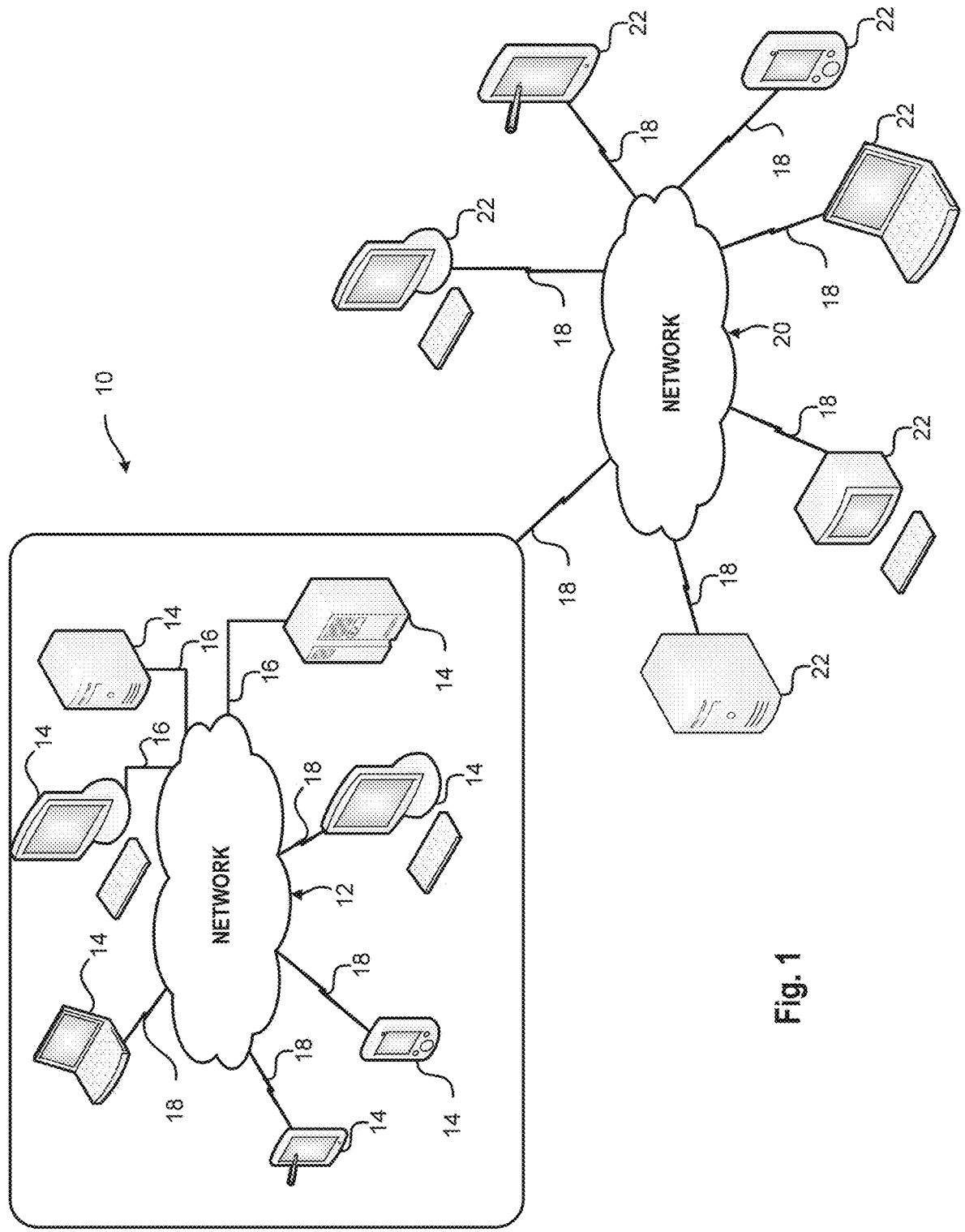
FIG. 1 is a schematic diagram of a data center including a networked system of information handling systems, according to one aspect of the present disclosure.

The following description in combination with the figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

According to various aspects, the present disclosure is directed to systems and methods for consensus driven threat intelligence, for example, for determining if a potential action, website, URL, or other activity is malicious or poses a threat, and doing so in a manner that is independent and trust agnostic e.g., a series of reviews (nodes) to independently determine validity/invalidity of the potential threat, and if a threat is found classifying the potential threat as valid or invalid, which finding can be added for a block of the blockchain, and used to develop.

In embodiments, such systems and methods may utilize a blockchain network comprising a plurality of blockchains. Each blockchain in the blockchain network may include one or more smart contracts. Each of the one or more smart contracts may be or may include an API, instructions, or other program configured to transmit, retrieve, and/or store generated threat intelligence data corresponding to the threat intelligence request. The threat intelligence request may correspond to a request or query to determine whether an internet based resource is a valid or invalid threat. Any one or more computing devices and/or users may submit the threat intelligence request to the blockchain network and a particular or corresponding smart contract (e.g., based on, for example, the type of threat intelligence request). The smart contract may be configured to transmit the threat intelligence request to one or more oracles in signal communication with the blockchain network based on, for example, the type of threat intelligence request. In an embodiment, the smart contract may be configured to, periodically or at a pre-specified time interval, transmit the threat intelligence request to the one or more oracles. In another embodiment, the smart contract may be configured to generate a schedule, the schedule defining the specified time interval that the smart contract may submit a threat intelligence request.

The one or more oracles may be configured to execute or to cause execution of a script, API, or other instructions or programs to generate the threat intelligence data on one or more corresponding nodes. The results from the one or more nodes may be transmitted back to the one or more oracles. Based on the responses from the one or more nodes a consensus was reached by the nodes to validate or invalidate the one or more oracles may then validate or invalidate a potential threat included in the threat intelligence request, e.g. in some embodiments, based on whether the validation or invalidation may be transmitted back to the smart contract and used to update the smart contract and in turn can be used to update or modify a corresponding block of the blockchain.

Each smart contract may be configured to transmit a threat intelligence request to the one or more oracles a plurality of times, generating a history for a particular potential threat. Further, the blockchain network may be configured to accept or receive requests to provide a watchlist. When a computing device or user requests a watchlist (e.g., submitting a request to the blockchain network for a watchlist or subset of a watchlist), each entry related to potential threats may include a history. For example, a website may initially be considered a 'safe' website. Over time, such a consideration or status may change for any reason. In such examples, analysis of the website or any other potential threat may be stored with a timestamp, subsequent analysis, an indicator of a compromise, an indicator of an attack, a reason or an indicator to indicate a reason the potential threat is malicious, a score, and/or other data. Thus, as a plurality of determinations that a potential threat is valid or invalid are generated or formed, a history of the potential threat may be formed. Further, each of the one or more oracle nodes or nodes may utilize the history to determine a set of results to be sent to the one or more oracles.

To reach consensus, the one or more oracles may utilize unanimous agreement from the one or more nodes. In another example, a threshold majority of nodes may be utilized to reach consensus (e.g., simple or some other specified percentage) agreement. The systems and methods may also be configured to enable users to stake tokens on particular potential intelligence threats or intelligence threat requests. For example, a user may stake a token indicating a vote that the potential intelligence threat is valid or invalid. If the position voted on by the user is validated, then the user may receive the amount of tokens the user staked plus additional tokens.

As shown in FIGS. 1-6, the present disclosure includes systems and methods for consensus. The systems and methods disclosed herein are adapted to enable creation of watchlists, including watchlists of malicious activities or actions, and/or other internet based resources (e.g. IP addresses, domains, files, URLs, etc.) in a substantially automatic and trusted manner via independent validation from nodes of the blockchain network driven threat intelligence. A consensus reached for a particular threat may indicate validation or invalidation of an actual threat and/or as a compromised and/or malicious internet based resource.

FIG. 1 is a block diagram of an exemplary data center 10 for consensus driven threat intelligence. As shown in FIG. 1, the data center 10 can include a network 12 that may provide communications among a plurality of information handling systems 14, which can include work stations, personal computers, smart cellular telephones, personal digital assistants, laptop computers, servers, computing devices, other suitable devices, and/or combinations thereof. The information handling systems 14 further can be coupled to the network 12 through wired line connections 16, wireless connections 18, or any other suitable lines of communication or connection. As further shown in FIG. 1, the data center 10, and/or one or more of the information handling systems 14 thereof, can be communicatively coupled to a network, including a cloud based or other network as shown at 12 or 20 in FIG. 1, for example, through wired line connection 16, or through any other suitable connection, such as a wireless connection 18 (e.g., WiFi, cellular, etc.). The network 12 further can be accessible to/by one or more user or client managed information handling systems or devices 22 to facilitate communication between the client managed information handling systems 22 and the data center 10 for which system logs may be parsed and/or parsing scripts and/or rules may be generated by an event management center. The network 12 can include an API interface of the event management center, though the network can include any suitable network, such as the Internet or other wide area network, a local area network, or a combination of networks, and may provide communications, e.g., data communications, among the event management center and the client managed information handling systems 22.

The client managed information handling systems 22 can be connected to the network 20 through wired connections, e.g., an Ethernet cable, or other suitable wired or wireless connections 18, e.g., WiFi, Bluetooth®, cellular connections (e.g., 3G, 4G, LTE, 5G, etc.), other suitable wireless connections or combinations thereof (FIG. 1), to enable the clients or operators of information handling systems 22 to communicate with the event management center, e.g., to access one or more services provided thereby. For example, the event management center can be or include a web service.

For purposes of the present disclosure, the information handling systems 14/22 may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. In one embodiment, the information handling systems may include storage, such as random access memory (RAM) or (ROM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen, and/or a video display. The information handling systems also may include one or more buses operable to transmit communications between the various hardware components.

Figure 2A:
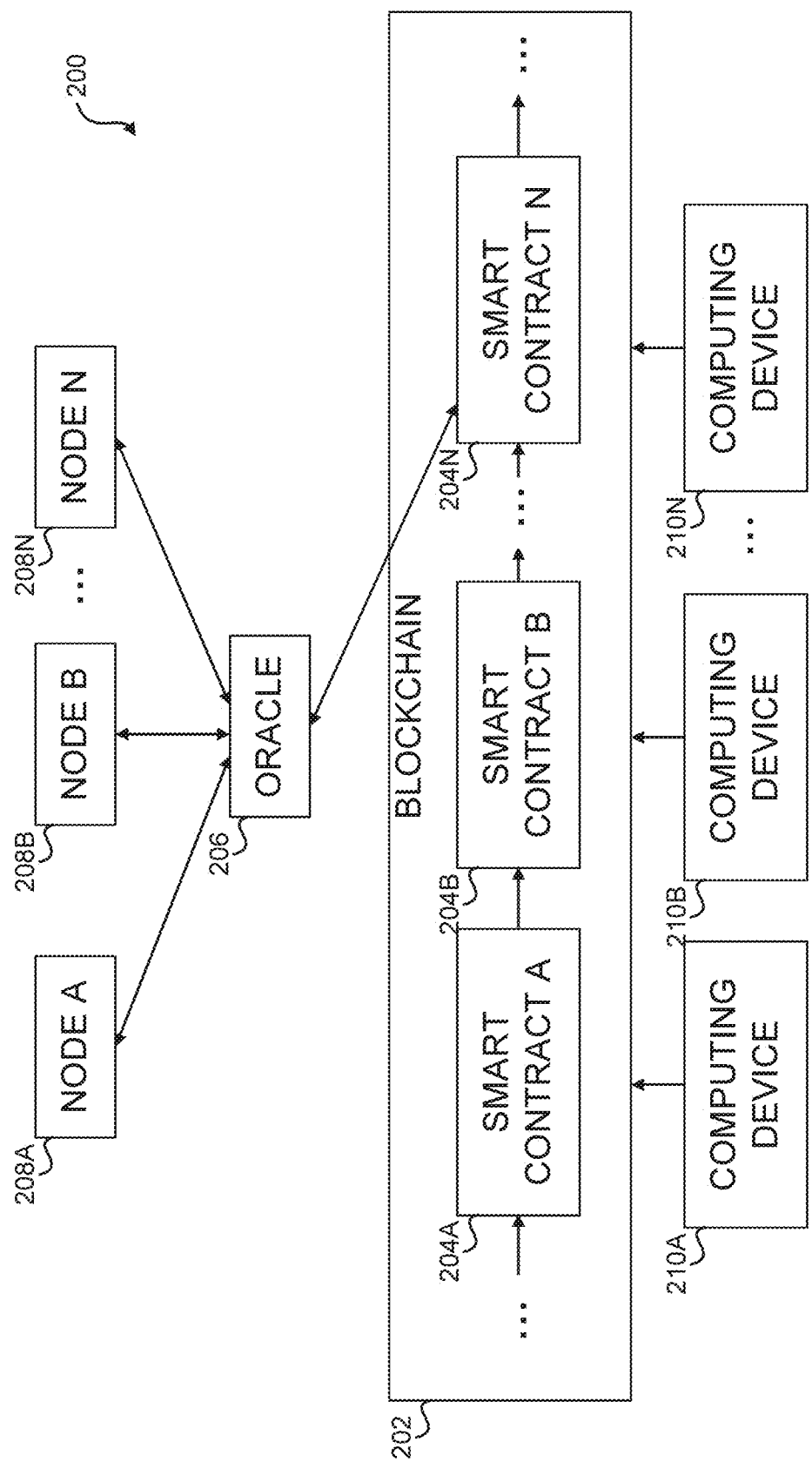
FIG. 2A, FIG. 2B, and FIG. 2C are schematic diagrams of systems for consensus driven threat intelligence, according to one aspect of the present disclosure.
Figure 2B:
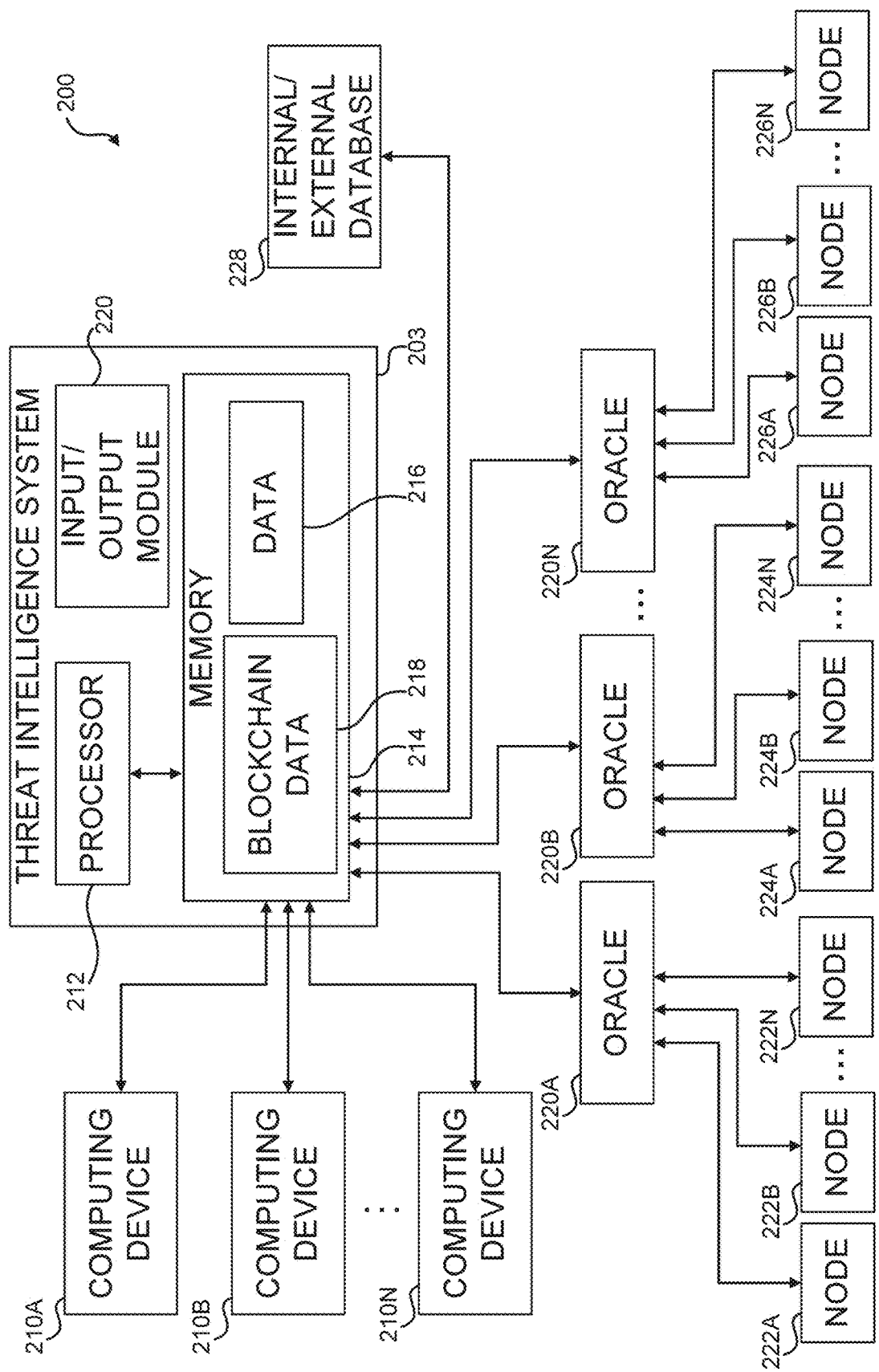
Figure 2C:
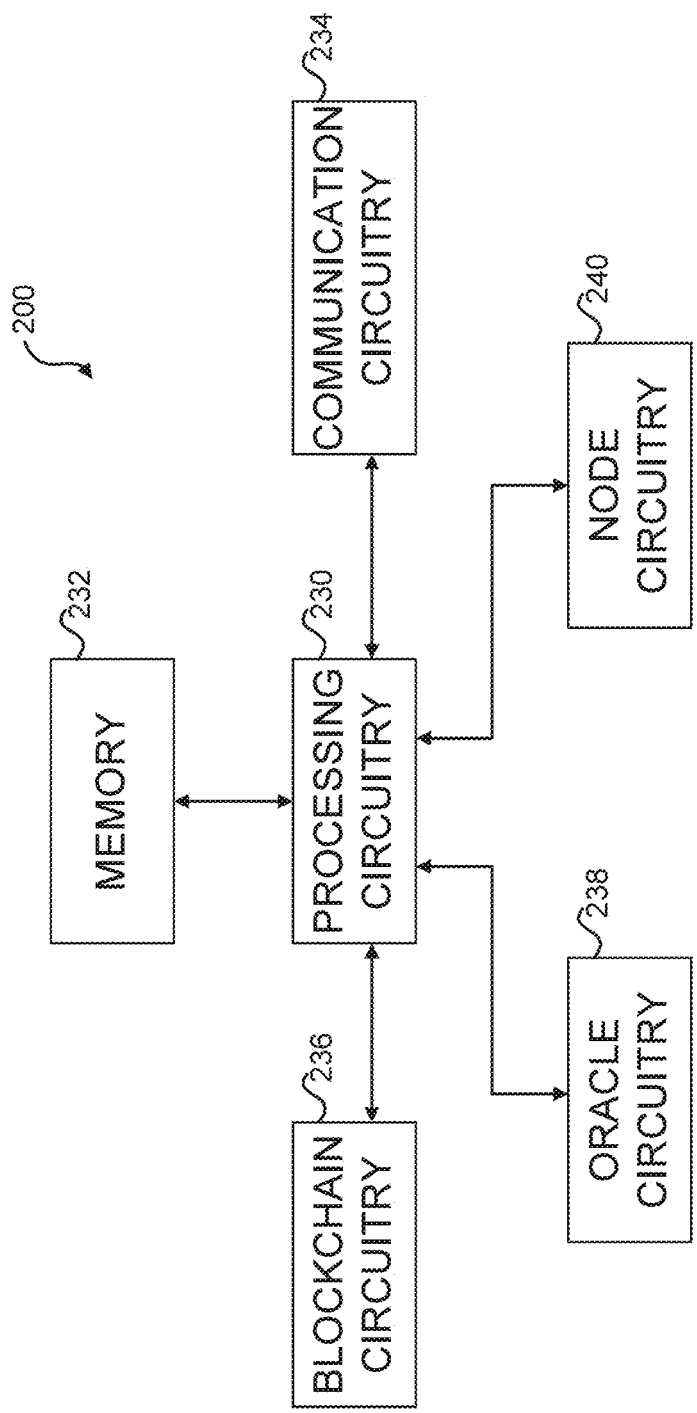

FIG. 2A, FIG. 2B, and FIG. 2C are schematic diagrams of systems for consensus driven threat intelligence, according to one aspect of the present disclosure. Turning first to FIG. 2A, a system 200 for generating consensus driven threat intelligence is illustrated. In such an embodiment, a blockchain or blockchain network 202 may include one or more smart contracts 204A, 204B, and up to 204N. The one or more smart contracts 204A, 204B, and up to 204N may handle or manage threat intelligence data and/or threat intelligence requests (e.g., the threat intelligence requests received from one or more computing devices 210A, 210B, and up to 210N). As noted one or more computing devices 210A, 210B, and up to 210N and/or one or more users (e.g., the users submitting the requests via the or more computing devices 210A, 210B, and up to 210N) may request that at least one of the one or more smart contracts 204A, 204B, and up to 204N gather threat intelligence data for a specified threat, potential threat, and/or threat intelligence request. The at least one of the one or more smart contracts 204A, 204B, and up to 204N also may store gathered results (e.g., validation or invalidation of a potential threat and/or corresponding data) on the blockchain or blockchain network 202.

Further, at least one of the one or more smart contracts 204A, 204B, and up to 204N may be utilized a plurality of times in relation to the specified threat, potential threat, and/or threat intelligence request, thus creating a history for that specified threat, potential threat, and/or threat intelligence request over a time interval or specified or preselected period of time. The specified threat, potential threat, and/or threat intelligence request may change over time or change a status (e.g., a threat or low to no threat) over time. The specified threat or potential threat may, for example, change from no threat to an actual threat, or from an actual threat to no threat based on varying factors (e.g., a resolution for a malicious threat is implemented, etc.). The specified threat or potential threat may change a plurality of times over time thus forming a history.

As noted, any user and/or one or more computing devices 210A, 210B, and up to 210N may request a threat validation or submit a threat intelligence request or operation. Such a request or submission may be automatically submitted based on various activities detected by or schedules implemented in or by the one or more computing devices 210A, 210B, and up to 210N. For example, a website may indicate to one or more computing devices 210A, 210B, and up to 210N that suspicious activity is occurring. In such examples, the one or more computing devices 210A, 210B, and up to 210N may automatically send the potential threat (e.g. a URL of the website and/or other internet resource threat information) with a request to gather threat intelligence data or validation, to the blockchain or blockchain network 202 and/or one or more smart contracts 204A, 204B, and up to 204N.

In an embodiment, the blockchain or blockchain network 202 may include software and/or hardware to parse or transmit received requests to at least one or more of the smart contracts 204A, 204B, and up to 204N based on a received threat intelligence request and/or information included in the threat intelligence request. In yet another embodiment, a user and/or the one or more computing devices 210A, 210B, and up to 210N may set or create a schedule for a threat intelligence request. In such embodiments, the threat intelligence request may be executed or performed by the at least one or more of the smart contracts 204A, 204B, and up to 204N at specified periods of time. In an embodiment, each of the one or more smart contracts 204A, 204B, and up to 204N may include one of a blockchain application or a byte code application.

The system 200 generally will include one or more oracles (e.g., oracle 206). In an embodiment, each one or more smart contracts 204A, 204B, and up to 204N may connect to one or more different oracles and/or one or more of the same oracles. While one oracle 206 is illustrated in FIG. 2A, it will be understood that such an embodiment is not limiting and that a plurality of oracles may be included in the system 200. The one or more oracles may gather the threat intelligence data and/or determine whether, based on received results, if a threat intelligence request includes a malicious internet based threat. The one or more oracles may connect the blockchain or blockchain network 202, typically unable to receive external data, to external data sources and/or real-world information, e.g., via the nodes or oracle nodes 208A, 208B, and up to 208N.

In such an embodiment, using the information in the threat intelligence request, each of the one or more nodes or oracle nodes 208A, 208B, and up to 208N called by the oracle 206 may gather threat intelligence data and/or perform a function or operation to gather such data or execute an operation to generate such data. For example, a node or oracle node may perform various operations, including, but not limited to, a banner grab, execute a port scan, execute an HTTP get command, open a website in an isolated environment, inspect a downloadable and/or installable software and/or firmware package, inspect a downloadable file, and so on.

Once the node or oracle node 208A, 208B, and up to 208N has performed such operations and/or gathered threat intelligence data, the node or oracle node 208A, 208B, and up to 208N may generate a validation or invalidation (e.g., whether a threat is present). The node or oracle node 208A, 208B, and up to 208N may return the validation or invalidation, along with other relevant data to the oracle 206. The oracle 206 may determine whether a consensus has been reached in regards to threat validation (e.g., whether a potential threat is malicious or not). A consensus will be determined based on the number of returned validations, and embodiments, a consensus will be reached if all nodes or oracles nodes 208A, 208B, and up to 208N return a validation. If all of the nodes that received the threat intelligence request do not return the same validate/invalidate response a consensus will not be reached and an error generated by the oracle 206 and all return an invalidation response. In yet another embodiment, the nodes or oracle nodes 208A, 208B, and up to 208N may return their individual decisions/results to the oracle 206 and the oracle 206 may determine if the potential threat is valid based on the results.

The oracle 206 may then return the consensus and related data to the at least one of the one or more smart contracts 204A, 204B, and up to 204N. The at least one of the one or more smart contracts 204A, 204B, and up to 204N may store the consensus and related data in the blockchain or blockchain network 202. The related data may include the validation or invalidation of the threat, a timestamp of when the threat was validated or invalidated, an indicator of a compromise, an indicator of an attack, a reason or an indicator to indicate a reason the potential threat is malicious, and a score indicating severity of the potential threat.

The one or more nodes or oracle nodes 208A, 208B, and up to 208N may include or call an API. The API may be added, included, or linked to the node or oracle node 208A, 208B, and up to 208N via or by a user, a computing device, the system 200, an administrator of the system 200, a curator of the system 200, and/or an internal and/or external user in relation to the blockchain or blockchain network 202.

Turning to FIG. 2B, the system 200 may include a threat intelligence system 203. The threat intelligence system 203 may include a processor 212 and memory 214. The memory 214 may include or store blockchain data 218. In another embodiment, the blockchain data 218 may be distributed across storage devices (e.g., the internal/external database 228), in addition to being stored in the memory 214. The threat intelligence system 203 may include other components such as an input/output module 220. The input/output module 220 may be configured to receive and/or transmit data from external sources (e.g., the oracles 220A, 220B, and up to 220N and/or the computing devices 210A, 210B, and up to 210N).

In an embodiment, the processor 212 may execute instructions stored in the memory 214, such as the APIs or other instructions or programs associated with, corresponding to, or comprising one or more smart contracts. In an embodiment, the oracles 220A, 220B, and up to 220N and nodes or oracle nodes (e.g., nodes or oracle nodes 222A, 222B, up to 222N, 224A, 224B, up to 224N, 226A, 226B, up to 226N) may be separate from or not included in the threat intelligence system 203. In another embodiment, the threat intelligence system 203 may include the oracles 220A, 220B, and up to 220N and/or nodes or oracle nodes (e.g., nodes or oracle nodes 222A, 222B, up to 222N, 224A, 224B, up to 224N, 226A, 226B, up to 226N) or instructions associated or corresponding therewith.

Turning to FIG. 2C, in an embodiment, the system 200 or apparatus may include a processing circuitry 230, memory 232, communications circuitry 234, blockchain circuitry 236, oracle circuitry 238, and node circuitry 240, each of which will be described in greater detail below. While the various components are only illustrated in FIG. 2C as being connected with processing circuitry 230, it will be understood that the system 200 or apparatus may further comprise a bus (not expressly shown in FIG. 2C) for passing information amongst any combination of the various components of the system 200 or apparatus. The system 200 or apparatus further may include programming or be configured to execute various operations described herein, such as those described above in connection with FIG. 1, FIG. 2A, and FIG. 2B and below in connection with FIG. 3, FIG. 4A, FIG. 4B, FIG. 5, and FIG. 6.

The processing circuitry 230 (and/or co-processor or any other processor assisting or otherwise associated with the processor) may be in communication with the memory 2232 via a bus for passing information amongst components of the system 200 or apparatus. The processing circuitry 230 may be embodied in a number of different ways and may, for example, include one or more processing devices configured to perform independently. Furthermore, the processing circuitry 230 may include one or more processors configured in tandem via a bus to enable independent execution of software instructions, pipelining, and/or multithreading. The use of the term "processor" may be understood to include a single core processor, a multi-core processor, multiple processors of the system 200 or apparatus, remote or "cloud" processors, or any combination thereof.

The processing circuitry 230 may be configured to execute software instructions stored in the memory 232 or otherwise accessible to the processing circuitry 230. In some cases, the processor may be configured to execute hard-coded functionality. As such, whether configured by hardware or software methods, or by a combination of hardware with software, the processing circuitry 230 represents an entity (e.g., physically embodied in circuitry) capable of performing operations according to various embodiments of the present invention while configured accordingly. Alternatively, as another example, when the processing circuitry 230 is embodied as an executor of software instructions, the software instructions may specifically configure the processing circuitry 230 to perform the algorithms and/or operations described herein when the software instructions are executed.

The memory 232 may be a non-transitory machine readable storage medium and may include, for example, one or more volatile and/or non-volatile memories. In other words, for example, the memory 232 may be an electronic storage device (e.g., a computer readable storage medium). The memory 232 may be configured to store information, data, content, applications, software instructions, or the like, for enabling the apparatus to carry out various functions in accordance with example embodiments contemplated herein.

The communications circuitry 234 may be any means such as a device or circuitry embodied in either hardware or a combination of hardware and software that is configured to receive and/or transmit data from/to a network and/or any other device, circuitry, or module in communication with the system 200 or apparatus. In this regard, the communications circuitry 234 may include, for example, a network interface for enabling communications with a wired or wireless communication network. For example, the communications circuitry 234 may include one or more network interface cards, antennas, buses, switches, routers, modems, and supporting hardware and/or software, or any other device suitable for enabling communications via a network. Furthermore, the communications circuitry 234 may include the processing circuitry for causing transmission of such signals to a network or for handling receipt of signals received from a network.

The system 200 or apparatus may include a blockchain circuitry 236 configured to provide or generate a blockchain structure or blockchain network. The blockchain network may be populated with one or more smart contracts specific to or corresponding to one or more different types of threats or based on another factor. Further, the one or more smart contracts may be added by a user or other external device and by way of examples, the blockchain circuitry 236 may generate an Ethereum based or other type of blockchain. The blockchain circuitry 236 may be configured to accept requests from one or more user or computing devices and parse the requests, sending each request to one or more smart contracts. The blockchain circuitry 236 further may be configured to receive results from one or more oracles, to determine whether a potential threat is a malicious threat, to sort the data stored in blockchain (e.g., a watchlist), and to provide the watchlist in a readable format to a requesting user. The blockchain circuitry 236 also may utilize the processing circuitry 230 to control one or more functions of one or more of these user interface elements through software instructions (e.g., application software and/or system software, such as firmware) stored on a memory (e.g., memory 232) accessible to the processing circuitry 230.

The system 200 or apparatus may include an oracle circuitry 238 configured to generate one or more oracles. The oracle circuitry 238 may be configured to, via the one or more oracles, securely link the blockchain to a set of APIs (e.g., nodes) to securely gather threat intelligence. The oracle circuitry 238 may be configured to, via the one or more oracles, transmit a threat intelligence request to one or more nodes and determine whether the threat intelligence request is valid (e.g., the threat is malicious) based on results received from the one or more nodes. The oracle circuitry 238 may utilize the processing circuitry 230 to control one or more functions of one or more of these user interface elements through software instructions (e.g., application software and/or system software, such as firmware) stored on a memory (e.g., memory 232) accessible to the processing circuitry 230.

The apparatus 200 may include a node circuitry 240 configured to provide or generate one or more nodes, each of the one or more nodes including one or more APIs. The node circuitry 240 may be configured to, via the one or more nodes, perform or execute an operation, API, or instructions to cause the node circuitry 240 to generate a set of results related to the threat intelligence request. The node circuitry 240 may utilize the processing circuitry 230 to control one or more functions of one or more of these user interface elements through software instructions (e.g., application software and/or system software, such as firmware) stored on a memory (e.g., memory 232) accessible to the processing circuitry 230.

Figure 3:
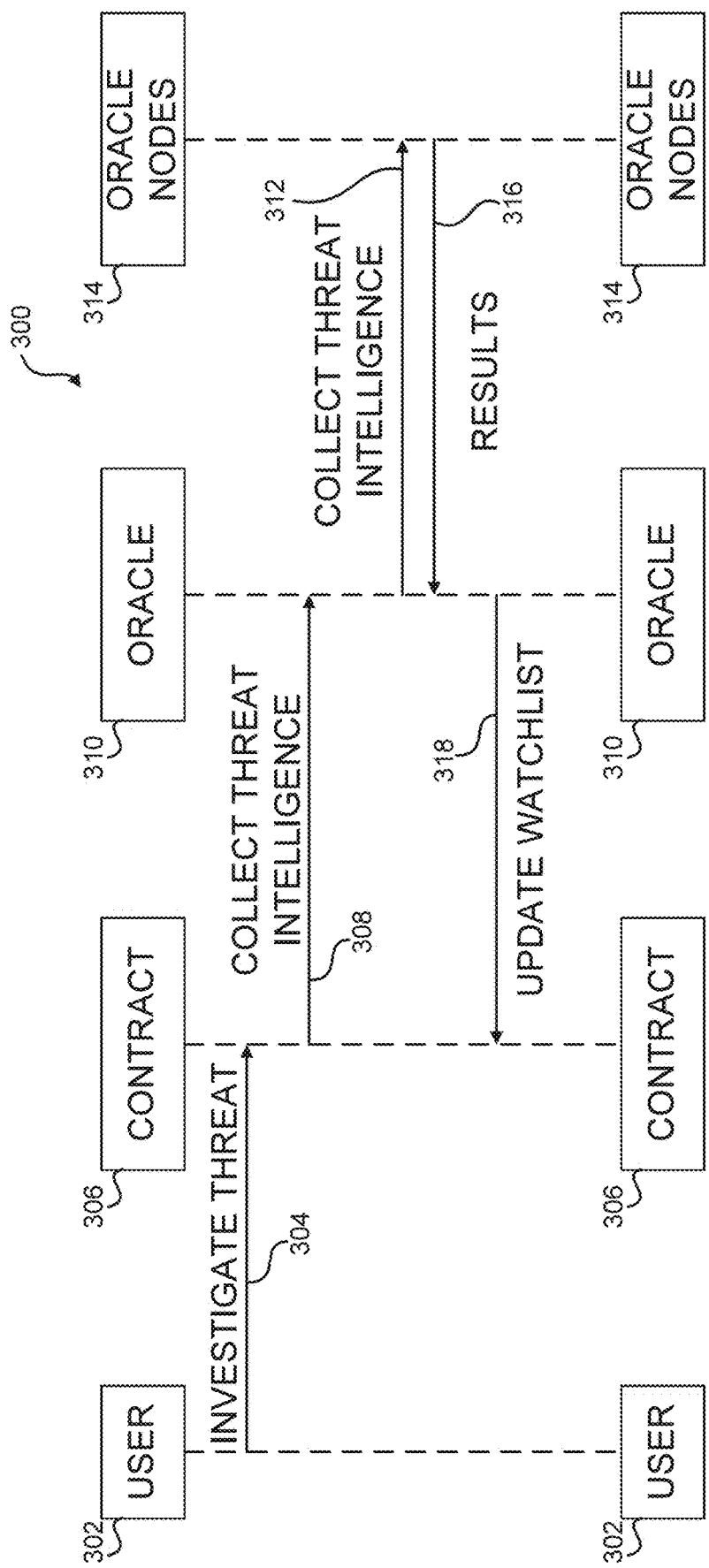
FIG. 3 is a flow diagrams for consensus driven threat intelligence, according to one aspect of the present disclosure.

FIG. 3 is a flow diagram schematically illustrating a consensus driven threat intelligence, according to one aspect of the present disclosure. A user 302 (e.g., a computing device or person utilizing a computing device) may submit a request. The user 302 may submit the request to the contract 306 (e.g., smart contract) via a user interface, a web based user interface, a restful API, another API, or via some other interface configured to send a request from a user 302 to a smart contract 306. In such examples, the user interface may be generated to include a text box or search box and an upload file area. A user 302 may input a type of request and upload relevant data (e.g., a URL, IP address, file, email, etc.). The user 302 may submit a request to investigate a threat 304.

The smart contract 306, via included instructions and/or APIs, may initiate the gathering or collecting of threat intelligence 308 regarding the potential threat. Such an initiation may include the smart contract 306 transferring the relevant data and other details to the oracle 310. The oracle 310 may select a particular subset of oracle nodes 314 based on the type of request, type of threat, and/or type of threat intelligence sought. The oracle 310 may transfer the relevant data and other details regarding a threat intelligence request directed to the potential threat to the oracle nodes 314. The oracle nodes 314 may execute one or more of a custom API, a user based API, an internal API (e.g., internal to an organization or enterprise), an enterprise-specific API (e.g., code or an API that executes on enterprise specific hardware to perform a threat intelligence request), or an external API (e.g., developed by a third party) to generate data for the threat intelligence request.

Once the oracle node 314 executes the API to generate data or results related to the threat intelligence request, the oracle node 314 may transmit results 316 to the oracle 310. The oracle 310 may determine whether consensus has been reached based on responses from the nodes, and if so, determine whether the threat intelligence request indicates a valid and/or malicious threat. The oracle 310 then may transmit the watchlist update 318 to the contract 306. The smart contract 306 may then update the watchlist in the blockchain based on the results and/or the validation or invalidation.

Figure 4B:
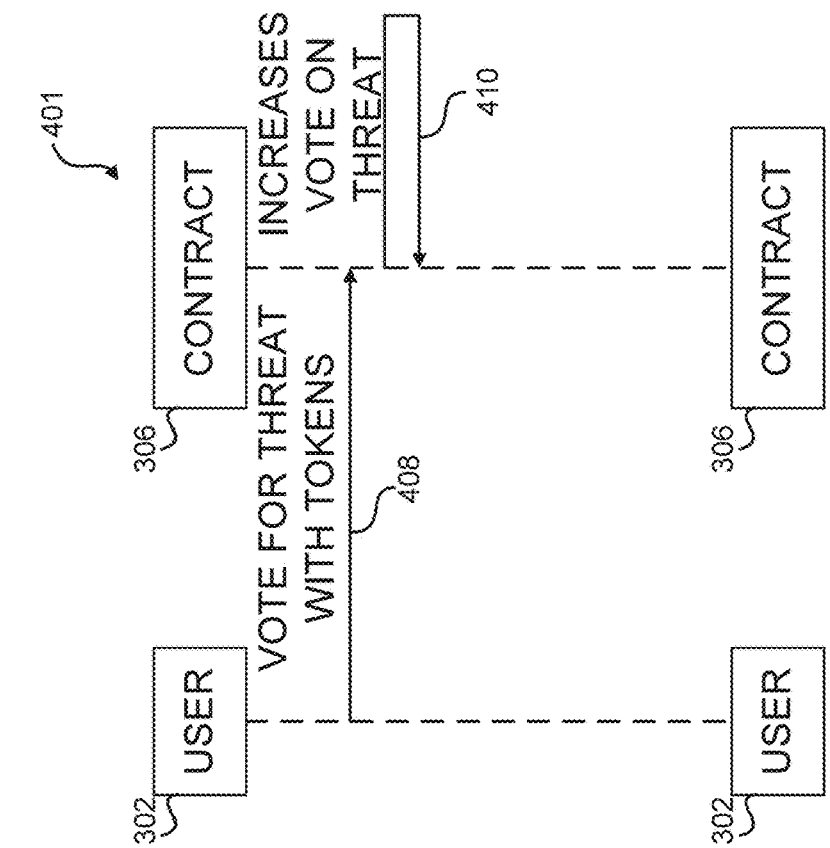
FIG. 4A and FIG. 4B is a flow diagrams for consensus driven threat intelligence, according to one aspect of the present disclosure.
Figure 4A:
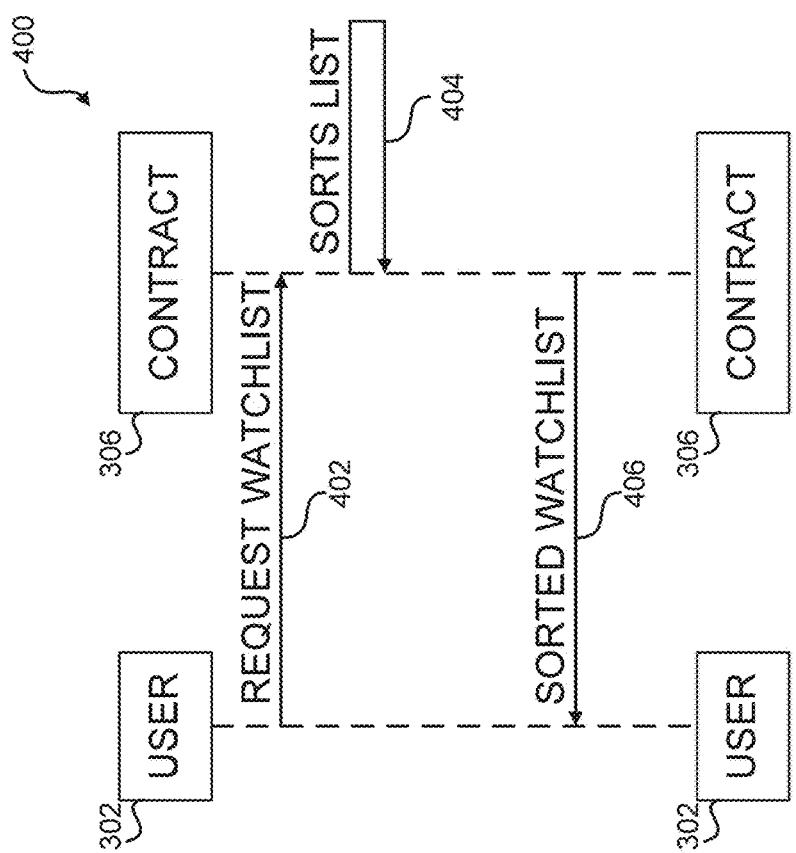

FIG. 4A and FIG. 4B is a flow diagrams for consensus driven threat intelligence, according to one aspect of the present disclosure. In an embodiment, the smart contract 306 may include an API to sort the watchlist 404. Such an operation may occur upon user request of the watchlist 402, at a pre-selected time period, and/or upon occurrence of other events. In such embodiments, a user 302 may request a watchlist 402. If the watchlist has not been sorted, or in some cases, regardless of whether the watchlist previously has been sorted or not, the smart contract 306 may sort the watchlist 402 based on one or more factors, such as sorting the watchlist 402 based on by age of the threat entry, a reason the threat entry is determined to be malicious, and a score relating to the determination of whether the potential threat is valid or invalid or based on severity of the threat. The sorted watchlist 406 may be provided to the user 302, via the smart contract 306, in one or more different formats, such as a text file, a word document, a spreadsheet, a pdf file, or some other user readable format.

Turning to FIG. 4B, the user 302 may stake or may vote for an intelligence threat with one or more tokens or portions of a token 408. The user 302 may vote to validate or invalidate the potential threat. The vote and staked tokens may be submitted to the smart contract 306 by the user 302. In other words, the user 302 may submit a vote with a number or portion of tokens indicating that the user 302 suspects that the threat is a valid threat or an invalid threat. The smart contract 306 may increase the number of votes on an intelligence threat 410 based on the number or portion of tokens staked. If the position voted on by the user wins or is the result of the operations described herein, then the user 302 may receive a portion of tokens staked for an opposite position or vote, as well as the original amount of tokens staked.

Figure 5:
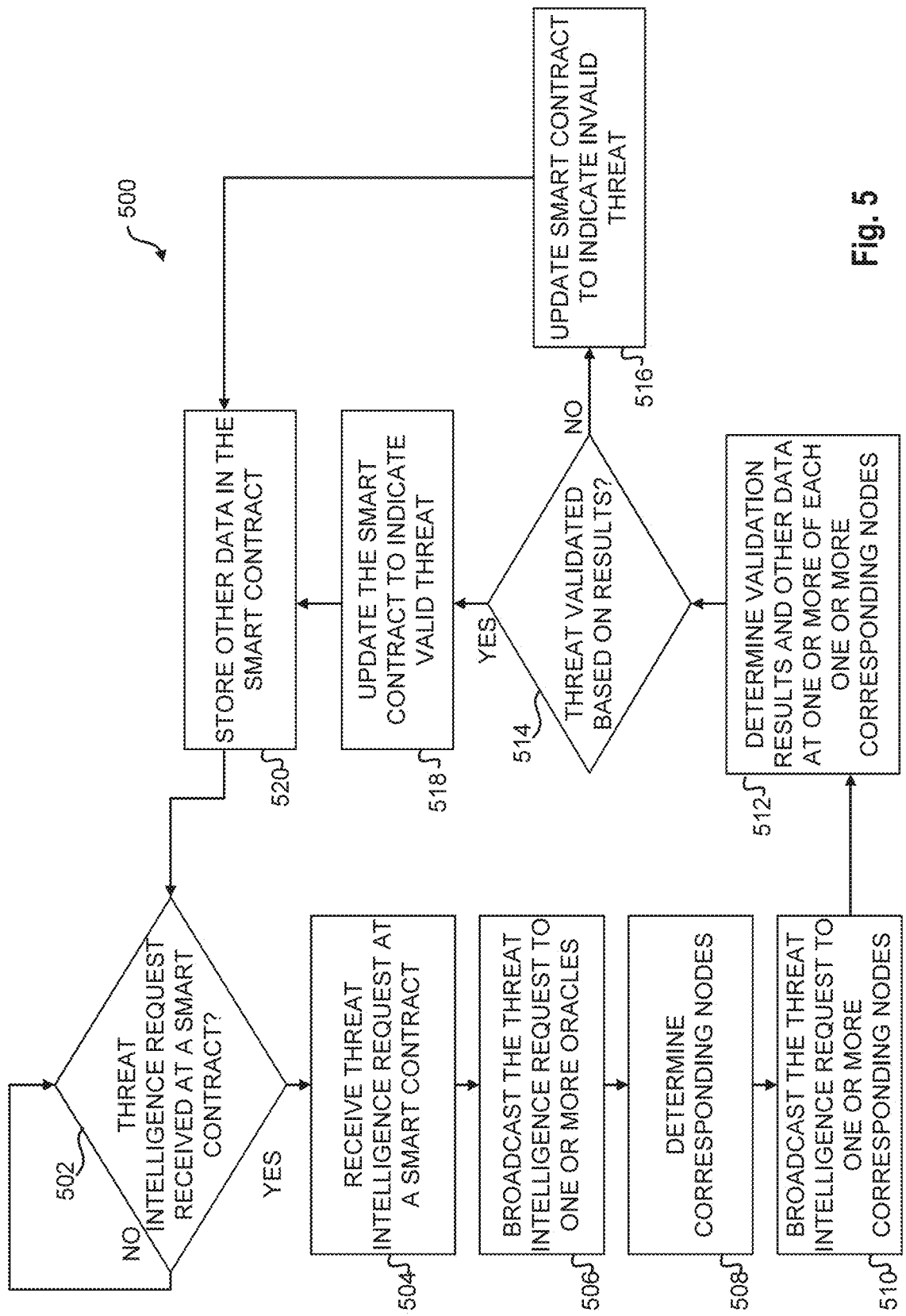
FIG. 5 is a method/process for consensus driven threat intelligence, according to one aspect of the present disclosure.

FIG. 5 is a method/process for consensus driven threat intelligence, according to one aspect of the present disclosure It also will be understood that any of the Figs. described herein may implement the method 500, in particular FIGS. 1-2C. Method 500 may be included in one or more programs, protocols, or instructions loaded into memory of a computing device. The order in which the operations are described is not intended to be construed as a limitation, and any number of the described blocks may be combined in any order and/or in parallel to implement the disclosed methods.

At block 502, a system (e.g., threat intelligence system 200 of FIGS. 2A-2C) may determine or check whether a request or threat intelligence request has been received. If a request has been received, from a user and/or computing device, the system may transmit the request to a smart contract or to a corresponding one or more smart contract.

At block 504 (FIG. 5), the smart contract may receive the threat intelligence request from the user and/or computing device. At block 506, the system and/or smart contract may broadcast the threat intelligence request to one or more oracles. At block 508, the oracle may determine corresponding nodes. In other words, the oracle may determine which nodes may be utilized for gathering threat intelligence data.

At block 510, the oracle may transmit or broadcast the threat intelligence request to the one or more corresponding nodes. The one or more corresponding nodes may execute APIs and/or other instructions or programs to gather threat intelligence. At block 512, the one or more corresponding nodes may determine validation results and other data. After a determination of validation results and other data, the one or more corresponding nodes may transmit the validation results and other data to the oracle. The oracle may determine whether the threat intelligence request is valid (e.g., the potential threat is malicious) or invalid (e.g., the potential threat is not malicious).

As noted, at block 514, the one or more oracles may determine whether the threat is valid based on the received results. If the threat is not valid, at block 516, the threat intelligence system may update the smart contract to indicate that the threat is invalid or not valid. If the threat is valid, at block 518, the threat intelligence system may update the smart contract to indicate a valid threat. In either case, the watchlist may be updated. Records may exist for a potential threat of the threat intelligence request. In such examples, the latest results may be stored in the blockchain network as an addition to the history of the potential threat. The smart contract, at block 520, may store the results along with other data (e.g., timestamp, indications of maliciousness, etc.)

Figure 6:
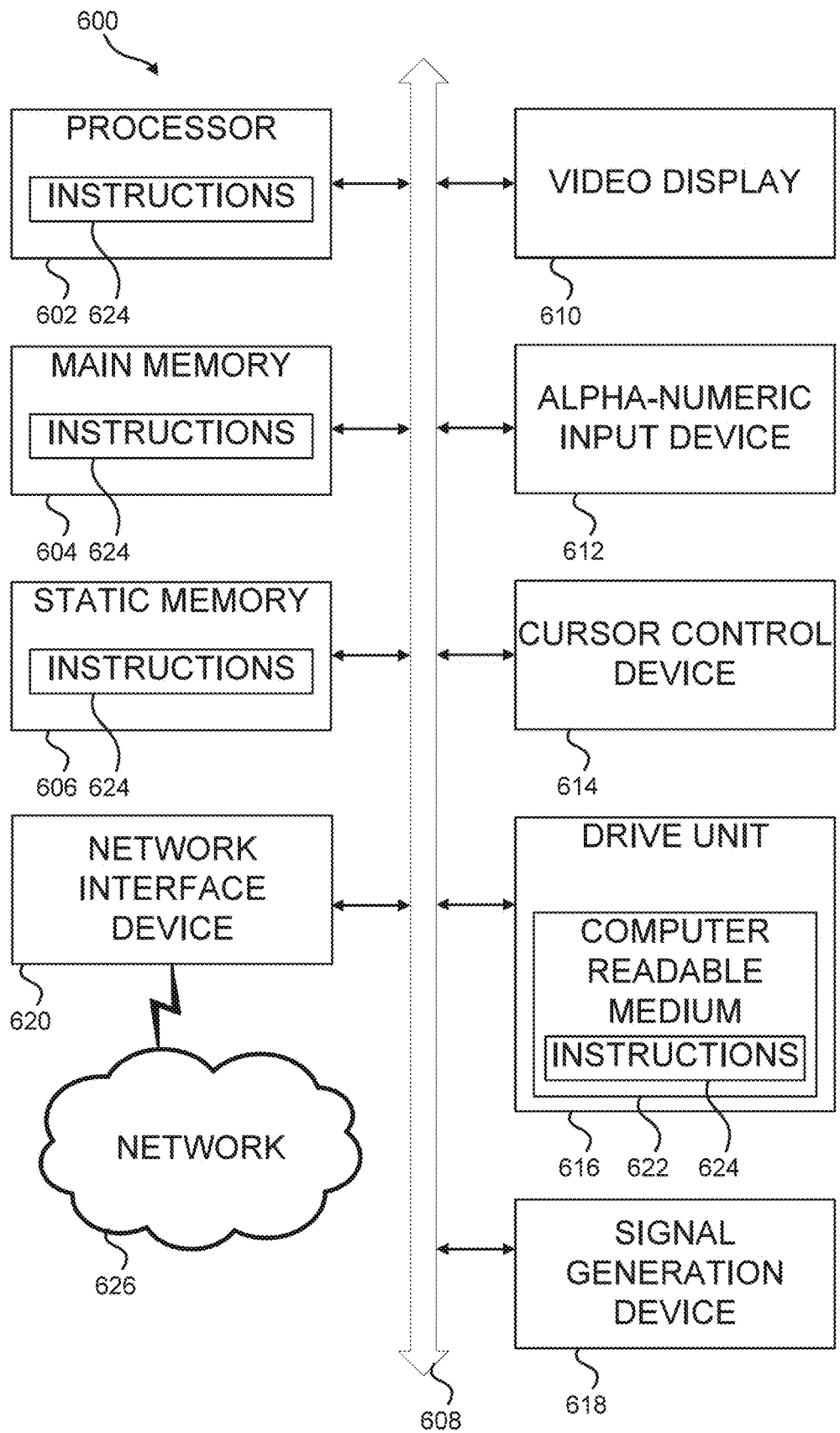
FIG. 6 is a schematic diagram of an information handling system capable of administering each of the specific embodiments, according to one aspect of the present disclosure.

FIG. 6 is a schematic diagram of an information handling system capable of administering each of the specific embodiments, according to one aspect of the present disclosure. The information handling system 600 can represent the systems of FIGS. 1 through 3. The information handling system 600 may include a computer system or processor 602 such as a central processing unit (CPU), a graphics processing unit (GPU), or both. Moreover, the information handling system 600 can include a main memory 604 and a static memory 607 that can communicate with each other via a bus 608. The information handling system 600 includes near-field communications (NFC) device and interface 618, such as an antenna and NFC subsystem. The information handling system 600 can also include a disk drive unit 616, and a network interface device 620. As shown, the information handling system 600 further may include a video display unit 610, such as a liquid crystal display (LCD), an organic light emitting diode (OLED), a flat panel display, a solid state display, or a cathode ray tube (CRT), or other suitable display. The video display unit 610 may also act as an input accepting touchscreen inputs. Additionally, the information handling system 600 may include an input device 612, such as a keyboard, or a cursor control device, such as a mouse or touch pad, or a selectable interface on the display unit. The information handling system may include a battery system 614. The information handling system 600 can represent a device capable of telecommunications and whose can be share resources, voice communications, and data communications among multiple devices. The information handling system 600 can also represent a server device whose resources can be shared by multiple client devices, or it can represent an individual client device, such as a laptop or tablet personal computer.

The information handling system 600 can include a set of instructions that can be executed to cause the processor to perform any one or more of the methods or computer based functions disclosed herein. The processor 602 may operate as a standalone device or may be connected such as using a network, to other computer systems or peripheral devices.

In a networked deployment, the information handling system 600 may operate in the capacity of a server or as a client user computer in a server-client user network environment, or as a peer computer system in a peer-to-peer (or distributed) network environment. The information handling system 600 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 600 is illustrated, the term "system" shall also be taken to include any collection of systems or subsystems that individually or jointly execute a set, or multiple sets, of instructions to perform one or more computer functions.

The disk drive unit 616 or static memory 614 may include a computer-readable medium 622 in which one or more sets of instructions 624 such as software can be embedded. The disk drive unit 616 or static memory 614 also contains space for data storage. Further, the instructions 624 may embody one or more of the methods or logic as described herein. In a particular embodiment, the instructions 624 may reside completely, or at least partially, within the main memory 604, the static memory 606, and/or within the processor 602 during execution by the information handling system 600. The main memory 604 and the processor 602 also may include computer-readable media. The network interface device 620 can provide connectivity to a network 626, e.g., a wide area network (WAN), a local area network (LAN), wireless network (IEEE 802), or other network. The network interface 620 may also interface with macrocellular networks including wireless telecommunications networks such as those characterized as 2G, 3G, 4G, 5G, LTE or similar wireless telecommunications networks similar to those described above. The network interface 620 may be a wireless adapter having antenna systems 632 for various wireless connectivity and radio frequency subsystems 630 for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal; so that a device connected to a network 628 can communicate voice, video or data over the network 628. Further, the instructions 624 may be transmitted or received over the network 628 via the network interface device 620. In a particular embodiment, BIOS/FW code 624 reside in memory 604, and include machine-executable code that is executed by processor 602 to perform various functions of information handling system 600.

Information handling system 600 includes one or more application programs 624, and Basic Input/Output System and Firmware (BIOS/FW) code 624. BIOS/FW code 624 functions to initialize information handling system 600 on power up, to launch an operating system, and to manage input and output interactions between the operating system and the other elements of information handling system 600.

In another embodiment (not illustrated), application programs and BIOS/FW code reside in another storage medium of information handling system 600. For example, application programs and BIOS/FW code can reside in drive 616, in a ROM (not illustrated) associated with information handling system 600, in an option-ROM (not illustrated) associated with various devices of information handling system 600, in storage system 607, in a storage system (not illustrated) associated with network channel 620, in another storage medium of the information handling system 600, or a combination thereof. Application programs 624 and BIOS/FW code 624 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile, read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.), or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The term "computing device" or "system device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used herein to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "non-transitory machine-readable storage medium" is used herein to refer to any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. The memory may store or include instructions executable by the processor.

The term "processor" or "processing circuitry" is used herein to refer to any one processor or multiple processors included in a single device or distributed across multiple computing devices. The processor may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

What is claimed is:

1. A method for consensus driven threat intelligence utilizing a blockchain network, the method comprising:
   receiving a threat intelligence request directed to at least one of one or more smart contracts implemented on a blockchain of the blockchain network and distributed to a plurality of nodes of the blockchain network, the threat intelligence request to include a request to gather intelligence related to a potential threat;
   broadcasting the threat intelligence request to one or more oracles configured to connect external information regarding potential threats to the blockchain;
   broadcasting the threat intelligence request from the one or more oracles to one or more corresponding nodes of the plurality of nodes;
   gathering threat intelligence data relating to the threat intelligence request at each of the one or more corresponding nodes;
   determining, via a threat intelligence operation conducted at each of the one or more corresponding nodes and based on gathered threat intelligence data, a validation or invalidation of the potential threat;
   determining whether a consensus has been reached as to whether the potential threat is valid or invalid as determined by the threat intelligence operations conducted by each of the one or more corresponding nodes;
   if a consensus is reached, submitting a threat entry including the gathered threat intelligence data relating to the determination of whether the potential threat of the threat intelligence request is valid or invalid resulting from the threat intelligence operations conducted by each of the one or more corresponding nodes to the at least one of the one or more smart contracts; and
   storing and sorting each threat entry on the blockchain using the smart contract.

2. The method of claim 1, wherein the potential threat is considered valid when each of the one or more corresponding nodes agrees on the validation of the potential threat submitted by the threat intelligence request.

3. The method of claim 1, further comprising, if a consensus is not reached as to whether the potential threat is valid or invalid as determined by the threat intelligence operations conducted by each of the one or more corresponding nodes, returning an error to the smart contract.

4. The method of claim 1, wherein the threat intelligence request is received from one or more computing devices, and wherein the one or more computing nodes are configured to stake tokens for or against validity of the potential threat.

5. The method of claim 1, wherein each threat entry comprises a timestamp, an indicator of a compromise, an indicator of an attack, a reason or an indicator to indicate a reason the potential threat is malicious, and the score.

6. The method of claim 5, further comprising voting on whether the potential threat is malicious based on the received score.

7. The method of claim 6, further comprising, in response to a request made to the at least one of the one or more smart contracts, generating a watchlist of threat entries from the blockchain, wherein the watchlist is sorted by age of the threat entry, a reason the threat entry is determined to be malicious, and a score relating to the determination of whether the potential threat is valid or invalid.

8. The method of claim 1, wherein each of the corresponding one or more nodes includes one or more of a custom API, a user based API, an internal API, an enterprise-specific API, or an external API.

9. The method of claim 1, wherein each of the corresponding one or more nodes validates potential threats via one or more of internet protocol (IP) address scans, advertisement banner grabs, network mapping, or gathering information from native sources, organic sources, or cultivated third party sources.

10. The method of claim 7, wherein the native sources, organic sources, or cultivated third party sources relate to the potential threat's capability, infrastructure, motives, goals, relationships, resources, or some combination thereof.

11. The method of claim 1, wherein each of the one or more smart contracts includes one of a blockchain application or a byte code application.

12. A system for consensus driven threat intelligence utilizing a blockchain network, the system comprising:
   one or more processors at a series of computing nodes of a distributed network, each of the computing nodes including a memory having a datastore configured to store and manage a blockchain of the blockchain networks comprising a plurality of smart contracts;
   a non-transitory machine readable storage medium storing computer readable instructions that are accessed and executed by the one or more processors of the computing nodes to cause the computing nodes to:
      receive a threat intelligence request directed to at least one of one or more smart contracts implemented on a blockchain of the blockchain network and distributed to a plurality of nodes of the blockchain network, the threat intelligence request to include a request to gather intelligence regarding a potential threat the threat intelligence request to include a potential threat;
      broadcast the threat intelligence request to one or more oracles configured to connect external information regarding potential threats to the blockchain;
      receive a validation or invalidation of the potential threat based on a broadcast of the threat intelligence request from the one or more oracles to corresponding one or more nodes of a plurality of nodes, the corresponding one or more nodes of a plurality of nodes to gather threat intelligence data relating to the threat intelligence request and to generate a validation or invalidation of the threat intelligence request;

determine whether a consensus has been reached as to whether the potential threat is valid or invalid as determined by the threat intelligence operations conducted by each of the one or more corresponding nodes; and if a consensus is reached, submit a threat entry including the gathered threat intelligence data relating to the determination of whether the potential threat of the threat intelligence request is valid or invalid resulting from the threat intelligence operations conducted by each of the one or more corresponding nodes to the at least one of the one or more smart contracts.

13. The system of claim 12, wherein each of the corresponding one or more nodes provides a timestamp, an indicator of a compromise, an indicator of an attack, a reason or an indicator to indicate a reason the potential threat is malicious, and a score.

14. The system of claim 13, wherein the computer readable instructions that are accessed and executed by the one or more processors of the computing nodes to cause the computing nodes to:

generate, in response to a received watchlist request from a computing device, a sorted watchlist, the watchlist including each validated potential threat; and transmitting the sorted watchlist to the computing device.

15. The system of claim 14, wherein the sorted watchlist is sorted based on one or more of the timestamp, the reason or the indicator to indicate the reason the potential threat is malicious, or a score.

16. The system of claim 12, wherein the one or more computing nodes are configured to stake tokens for or against validity of the potential threat.

17. The system of claim 16, wherein, if the potential threat is validated, computing nodes that staked tokens for validity of the potential threat receive the staked tokens and additional tokens.

18. A system for consensus driven threat intelligence utilizing a blockchain network, the system comprising:

a blockchain circuitry configured to:

store one or more smart contracts, the one or more smart contracts generated by one or more computing nodes to thereby define a blockchain of the blockchain network, receive a threat intelligence request directed to at least one of the one or more smart contracts implemented on a blockchain of the blockchain network and distributed to a plurality of nodes of the blockchain network, the threat intelligence request to include a request to gather intelligence related to a potential threat, broadcast, based on an API in the at least one of the one or more smart contracts corresponding to the potential threat, the threat intelligence request to one or more oracles configured to connect external information regarding potential threats to the blockchain;

receive validation data from the one or more oracles, and store results associated with the validation data;

an oracle circuitry including the one or more oracles and configured to:

receive the threat intelligence request from the at least one of the one or more smart contracts, broadcast the threat intelligence request to one or more nodes corresponding to the one or more oracles, receive results from the one or more nodes, the results to include data indicating validation or invalidation of the potential threat of the threat intelligence request, and validate the potential threat based on the results from each of the one or more nodes; and a node circuitry configured to:

perform a threat assessment operation using data related to the potential threat of the threat intelligence request; and transmit the results to the corresponding one or more oracles.

19. The system of claim 18, wherein the each of the one or more smart contracts is configured to, in response to a request received from the one or more computer nodes, generate a watchlist based on the threat entries stored on the blockchain circuitry.

20. The system of claim 18, wherein the oracle circuitry utilizes results received from the one or more nodes within a specified time for the threat intelligence request.

* * * * *